United States Patent
Sakai

(10) Patent No.: US 8,434,127 B2
(45) Date of Patent: Apr. 30, 2013

(54) ACCESS CONTROL SYSTEM, ACCESS CONTROL METHOD, ELECTRONIC DEVICE AND CONTROL PROGRAM

(75) Inventor: Junji Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 901 days.

(21) Appl. No.: 12/448,729

(22) PCT Filed: Feb. 8, 2008

(86) PCT No.: PCT/JP2008/052118
§ 371 (c)(1),
(2), (4) Date: Jul. 2, 2009

(87) PCT Pub. No.: WO2008/096848
PCT Pub. Date: Aug. 14, 2008

(65) Prior Publication Data
US 2009/0300713 A1  Dec. 3, 2009

(30) Foreign Application Priority Data
Feb. 8, 2007  (JP) ................................. 2007-029677

(51) Int. Cl.
*G06F 21/00* (2006.01)
(52) U.S. Cl.
USPC ...... 726/1; 726/13; 726/17; 726/27; 713/166; 713/170; 380/44; 380/278; 455/63.1; 705/54; 705/59; 709/223; 709/229
(58) Field of Classification Search .................. 726/1–2, 726/29
See application file for complete search history.

(56) References Cited

U.S. PATENT DOCUMENTS

| | | | | |
|---|---|---|---|---|
| 5,802,590 | A | * | 9/1998 | Draves .......................... 711/164 |
| 6,088,725 | A | * | 7/2000 | Kondo et al. ................. 709/220 |
| 6,389,540 | B1 | | 5/2002 | Scheifler et al. |
| 6,754,829 | B1 | * | 6/2004 | Butt et al. ......................... 726/8 |
| 6,934,758 | B2 | | 8/2005 | Scheifler et al. |
| 6,978,366 | B1 | * | 12/2005 | Ignatchenko et al. ........ 713/166 |
| 7,039,779 | B2 | * | 5/2006 | Kawasaki et al. ............. 711/163 |
| 7,107,377 | B2 | * | 9/2006 | Komatsu et al. .............. 710/200 |

(Continued)

FOREIGN PATENT DOCUMENTS

| | | |
|---|---|---|
| JP | 7-200317 A | 8/1995 |
| JP | 8-278953 | 10/1996 |

(Continued)

OTHER PUBLICATIONS

Gross et al., "Information Revelation and Privacy in Online Social Networks (The Facebook case)", Pre-proceedings version. ACM Workshop on Privacy in the Electronic Society (WPES), 2005, Nov. 7, 2005, Alexandria, Virginia, USA.*

*Primary Examiner* — Morshed Mehedi
(74) *Attorney, Agent, or Firm* — Foley & Lardner LLP

(57) ABSTRACT

Provided is the access control system for controlling an access on a task basis without modifying a device side to be accessed and without applying a task ID at each access to a device.
The access filter system for controlling an access between devices mounted on an electronic device, which comprises the access control unit for applying a unique device key set for each device as a right to access the device on a basis of a task operable on the electronic device and determining whether to allow an access to the device according to whether an access request task which requests an access to the device has the device key.

38 Claims, 17 Drawing Sheets

U.S. PATENT DOCUMENTS

| | | | |
|---|---|---|---|
| 7,146,133 B2 * | 12/2006 | Bahl et al. | 455/63.1 |
| 7,219,369 B2 * | 5/2007 | Hashimoto et al. | 726/21 |
| 7,356,832 B1 * | 4/2008 | Eibach et al. | 726/2 |
| 7,743,407 B2 | 6/2010 | Sprigg et al. | |
| 8,045,530 B2 * | 10/2011 | Haverinen et al. | 370/338 |
| 2003/0235309 A1 * | 12/2003 | Struik et al. | 380/278 |
| 2006/0090202 A1 * | 4/2006 | Liu et al. | 726/17 |
| 2006/0239452 A1 * | 10/2006 | Jung et al. | 380/44 |
| 2007/0079122 A1 * | 4/2007 | Han et al. | 713/170 |
| 2008/0005779 A1 * | 1/2008 | Takenaka et al. | 726/1 |
| 2009/0300710 A1 * | 12/2009 | Chai et al. | 726/1 |

FOREIGN PATENT DOCUMENTS

| | | |
|---|---|---|
| JP | 9-305418 | 11/1997 |
| JP | 2001-290691 A | 10/2001 |
| JP | 2001-325150 A | 11/2001 |
| JP | 2002-505476 A | 2/2002 |
| JP | 2002-342166 A | 11/2002 |
| JP | 2005-502128 A | 10/2005 |
| JP | 2006-252345 A | 9/2006 |
| WO | WO 99/44137 A2 | 9/1999 |
| WO | WO/03/021467 A1 | 3/2003 |

* cited by examiner

11 DEVICE KEY MANAGEMENT TABLE

|    | mask | val | KA | KU |
|----|------|-----|----|----|
| S0 |      |     |    |    |
| S1 |      |     |    |    |
|    |      |     |    |    |
| S$i$ | ADM$i$ | ADV$i$ | KA$i$ | KU$i$ |
|    |      |     |    |    |

12 ACCESS FILTER MATRIX

|    | M0 | M1 |  | M$j$ |  |
|----|----|----|--|------|--|
| S0 |    |    |  |      |  |
| S1 |    |    |  |      |  |
|    |    |    |  |      |  |
| S$i$ |    |    |  | AFM$i,j$ |  |
|    |    |    |  |      |  |

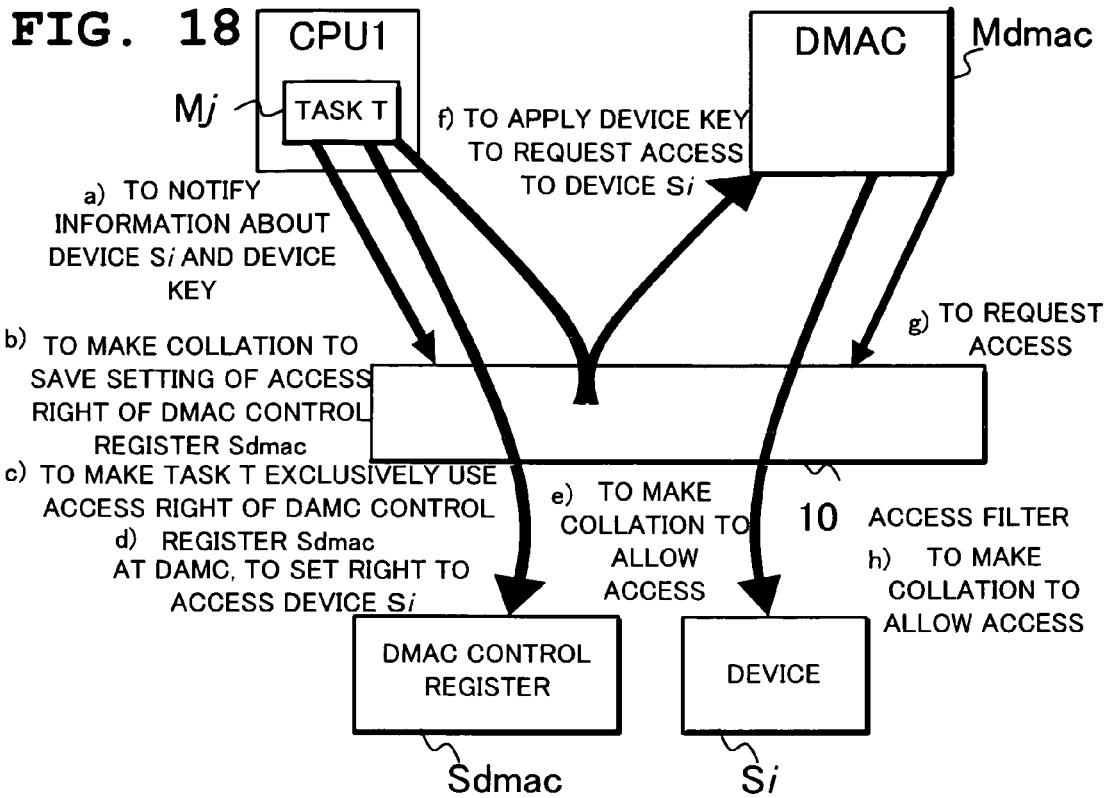
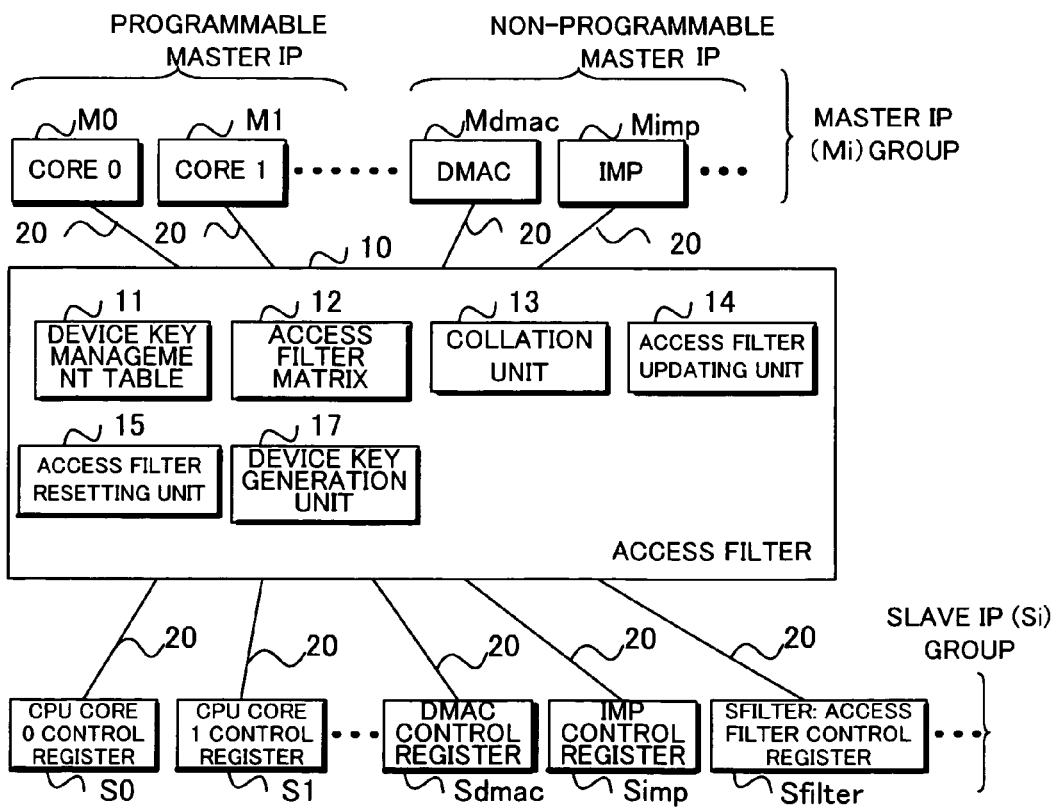

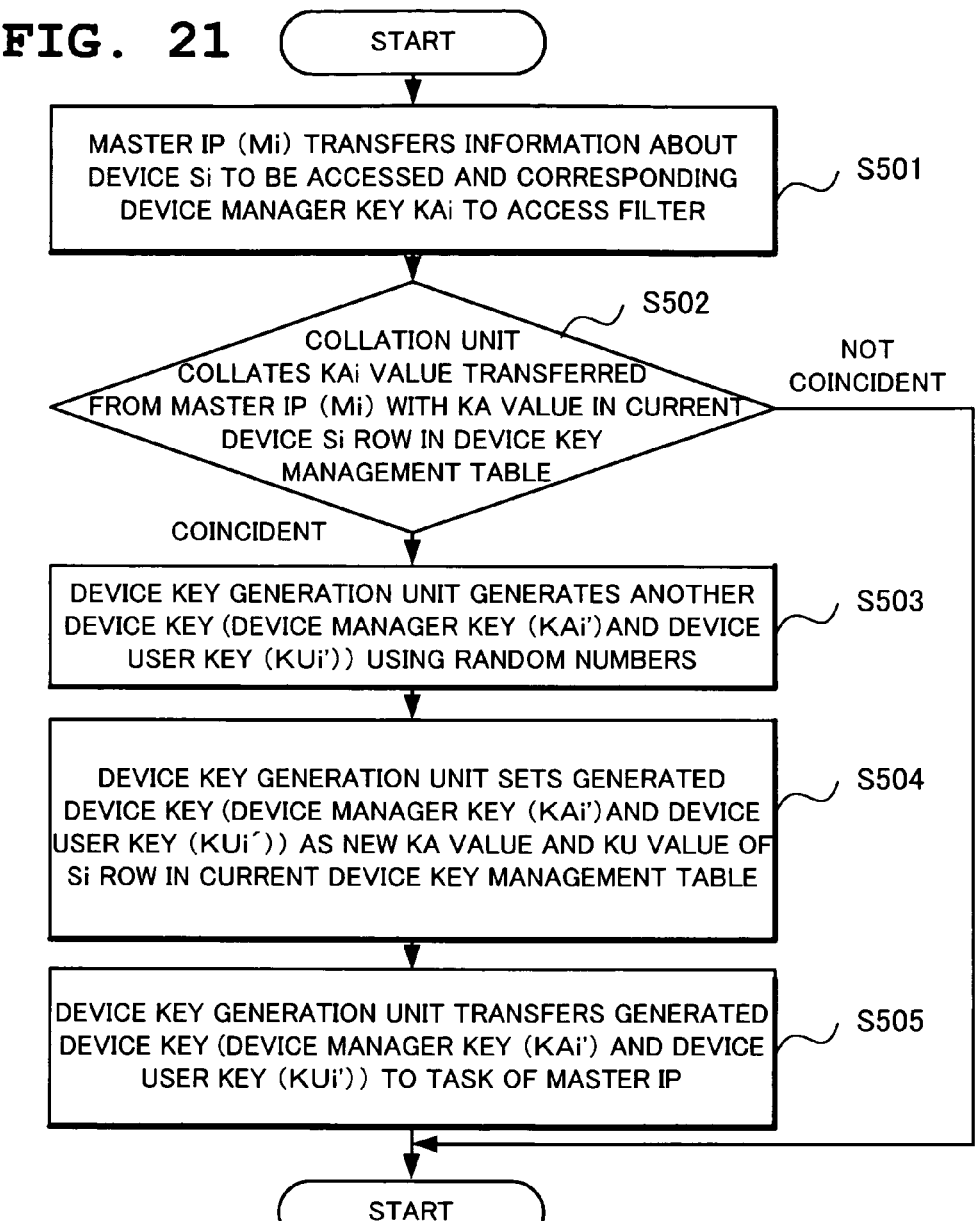

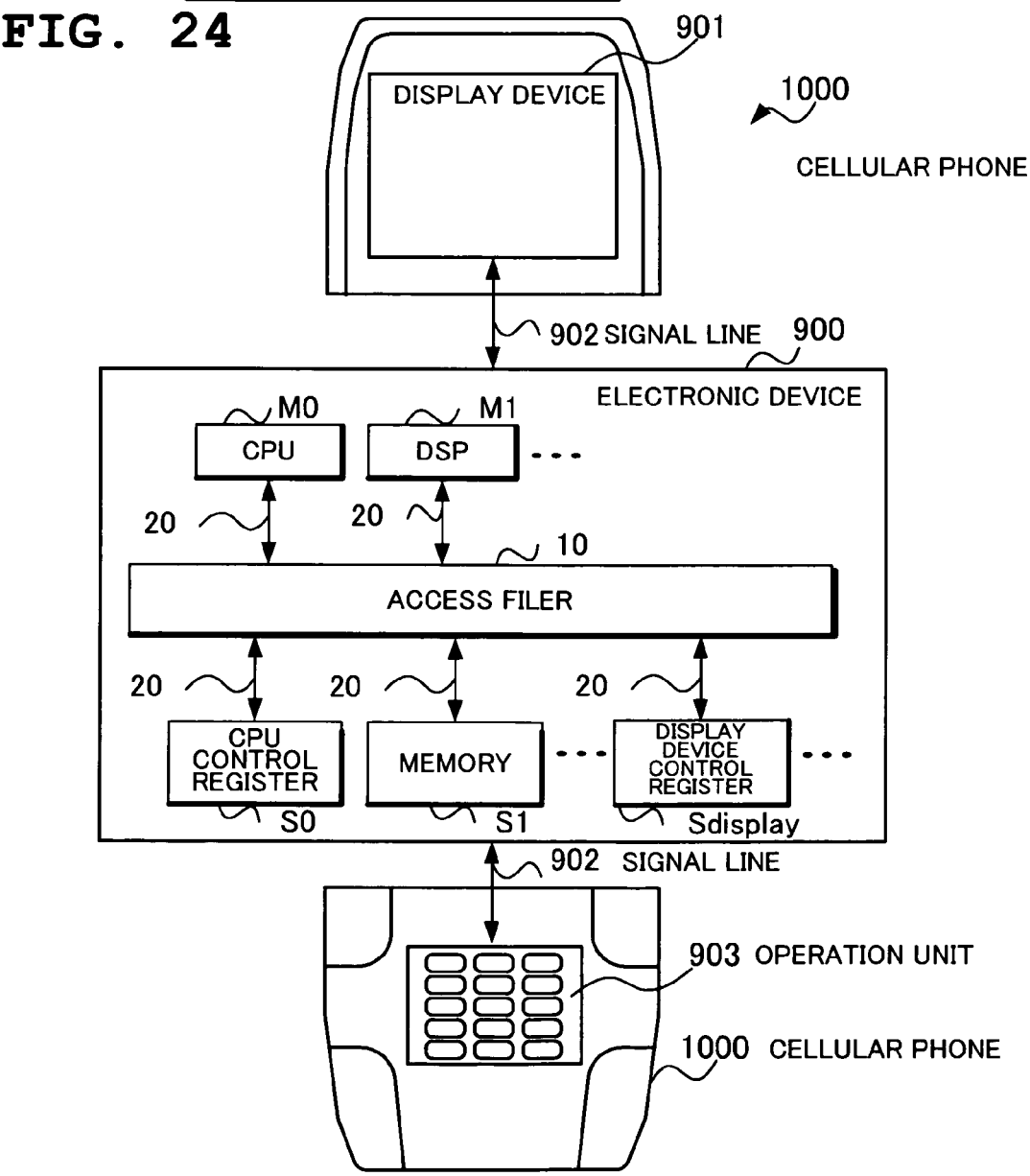

ACCESS CONTROL SYSTEM, ACCESS CONTROL METHOD, ELECTRONIC DEVICE AND CONTROL PROGRAM

This application is the National Phase of PCT/JP2008/052118, filed Feb. 8, 2008, the disclosure of which is hereby incorporated by reference in its entirety.

TECHNICAL FIELD

The present invention relates to an access control system, an access control method, an electronic device and a control program for controlling an access between devices.

BACKGROUND ART

In recent years, electronic devices provided with an information communication function including a mobile terminal such as a mobile phone and an information communication terminal to be mounted on an automobile have their electronic parts made into one chip or more highly integrated in response to demands for reduction in scale and cost. In line with these situations, design has been made such that a plurality of tasks (programs) which operate on a CPU of an electronic device to realize various kinds of functions share a plurality of devices (e.g. DSP (Digital Signal Processor) or a memory).

Under these circumstances, in a case where a plurality of tasks use the same memory, for example, there possibly occurs a situation where one task exerts such an adverse effect on other task processing as disabling continuation of the processing.

Although with respect to, for example, communication between tasks operable on a plurality of CPUs such as a multi-core CPU or communication between tasks operable on a CPU and a DSP, perfunctory security is given by some security software, in a case where one memory is shared, there might occur a situation where one task destroys a memory region to be used by other task or where one task alters data on a memory processed by other task. In addition, the same situation might occur not only in a case of memory sharing but also in other device sharing.

Various control methods are proposed in order to prevent occurrence of the above-described problems in advance in the above-described case where a plurality of tasks (programs) use one device in common. In the following, the proposed control methods will be described with respect to literature.

Related art whose one example is recited in Patent Literature 1 (Japanese Patent Laying-Open No. 2002-342166) aims at improving security at the time of task change by enabling an access level to be changed only at the detection of an access to an address for a level change routine when an access level is changed and returning to a management program without fail after execution of the level change routine.

Related art whose one example is recited in Patent Literature 2 (Japanese Patent Laying-Open No. 2001-290691) discloses the system in which a secondary storage device registers a token that is generated in file open processing together with a file identifier of the opened file and notifies a user program of the registration, the user program records the notified token and file identifier in pair and transfers the paired token and file identifier when executing input/output processing on a file basis, and the secondary storage device which is asked to input/output on a file basis executes file input/output processing based on whether the designated pair of file identifier and token is registered or not. Such related art enables an unauthorized file access from a user program to be prevented while providing the user program with a file input/output function with low overhead without intermediary of an OS (Operation System).

Related art whose one example is recited in Patent Literature 3 (Japanese Patent Laying-Open No. 08-278953) discloses the system having a queue for sequentially queuing a computer discrimination number, a task number and a group number in an exclusive control request made from one of computers into each data region of each shared data device, a flag register in which a flag is set when none of the computers makes an exclusive control request on a basis of a data region of a shared data device, and a management table for automatically generating as many flag regions as the number of all the exclusive control requests having the same group number designated on a computer basis to set a flag of an exclusive control request allowed to access a data region, thereby executing simultaneous exclusive control access to a plurality of the data regions bridging over a plurality of shared data devices. Such related art enables loads on a computer or a shared data device related to an exclusive control request for accessing common resources in a decentralized processing system to be mitigated.

Japanese Patent Laying-Open No. 2002-342166.
Japanese Patent Laying-Open No. 2001-290691.
Japanese Patent Laying-Open No. 08-278953.

Among the control methods as related art, the related art recited in Patent Literature 1, in particular, has a problem because in order to find a task change, instruction fetch address coincidence is determined to sense call-up of specific processing (access level change routine) and allow access level change, there might occur a case where with an instruction cache, the access level change routine cannot be detected, and application to other master than a CPU is difficult because of lack of ordinary instruction fetch.

The related art recited in Patent Literature 2 also has the problems that modification (packaging of a token generation mechanism) is basically required on a target device side, that OS is used for the check in first open, that no access authorization continues over one open-close period of a target device and that no access authorization is assigned to other arbitrary master.

Furthermore, while the related art recited in Patent Literature 3 (Japanese Patent Laying-Open No. 08-278953) enables assignment of a task ID each time in a case of exclusive control, assigning a task ID at each target device access (e.g. read/write of memory) is hard to realize and impractical.

THE OBJECT OF THE INVENTION

An object of the present invention is to provide an access control system, an access control method, an electronic device and a control program for controlling an access on a task basis without altering a device side to be accessed and without assigning a task ID in each access to a device.

SUMMARY

According to a first exemplary aspect of the invention, an access control system for controlling an access between devices mounted on an electronic device, comprises an access control unit which applies unique secret information set for each the device as a right to access the device on a basis of a task operable on the electronic device and determines whether to allow an access to the device or not according to whether an access requesting task which requests an access to the device has secret information of the device.

According to a second exemplary aspect of the invention, an access control method of controlling an access between devices mounted on an electronic device, comprises an access control step of applying unique secret information set for each the device as a right to access the device on a basis of a task operable on the electronic device and determining whether to allow an access to the device or not according to whether an access requesting task which requests an access to the device has secret information of the device.

According to a third exemplary aspect of the invention, an electronic device mounted with an access control unit for controlling an access between devices, wherein the access control unit applies unique secret information set for each the device as a right to access the device on a basis of a task operable on the electronic device and determines whether to allow an access to the device or not according to whether an access requesting task which requests an access to the device has secret information of the device.

According to a fourth exemplary aspect of the invention, a control program executed on a computer to control an access between devices mounted on an electronic device, which causes the computer to execute an access control processing of applying unique secret information set for each the device as a right to access the device on a basis of a task operable on the electronic device and determining whether to allow an access to the device or not according to whether an access requesting task which requests an access to the device has secret information of the device.

The present invention enables device access control on a task basis.

The reason is that because unique secret information set for each device is assigned as a right to access the device on a basis of a task operable on an electronic device to determine whether to allow an access to the device according to whether an access requesting task which requests an access to the device has secret information of the device or not, the task requesting the access to the device is allowed to access the device when assigned predetermined secret information.

BRIEF DESCRIPTION OF THE DRAWINGS

FIG. 18 is a diagram for use in explaining operation of the entire access filter system according to the second mode of implementation;

FIG. 19 is a block diagram showing an example of a structure of an access filter system according to a third mode of implementation of the present invention;

FIG. 21 is a flow chart showing operation of the access filter system according to the third mode of implementation;

FIG. 22 is a diagram for use in explaining an access filter matrix according to a fourth mode of implementation of the present invention;

FIG. 23 is a diagram for use in explaining a device key management table according to a sixth (*fifth?) mode of implementation of the present invention;

FIG. 24 is a diagram showing an embodiment of an electronic device comprising a circuit having the access filter system according to the present invention.

EXEMPLARY EMBODIMENT (First Mode of Implementation)

An access filter system according to a first mode of implementation of the present invention will be described in detail with reference to the drawings.

(Structure of the First Mode of Implementation)

Figure 1:
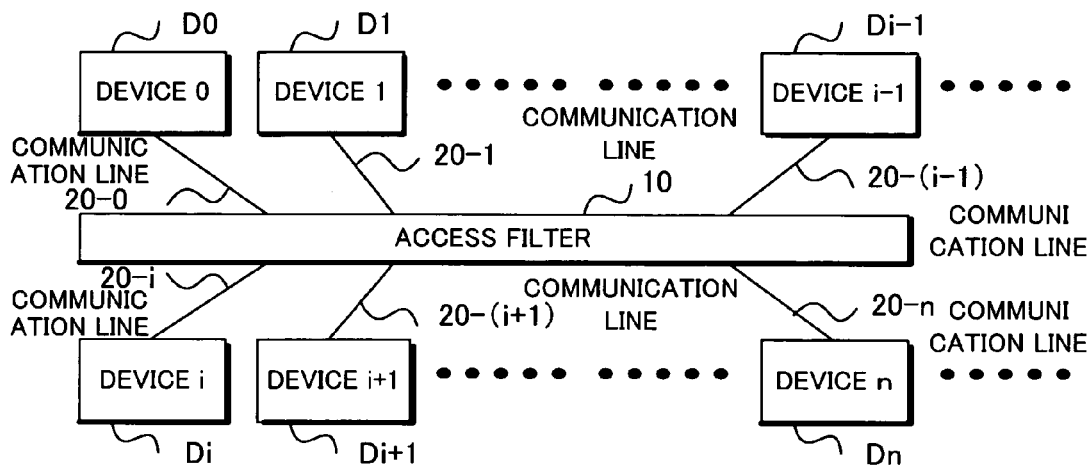
FIG. 1 is a block diagram schematically showing a structure of an access filter system according to a first mode of implementation of the present invention.

FIG. 1 is a block diagram schematically showing a structure of the access filter system according to the present mode of implementation.

With reference to FIG. 1, the access filter system according to the present mode of implementation comprises an access filter 10 having a function of determining allowance/refusal of an access between devices which is provided on a communication line 20 on which all the communication between devices as a target of access control passes.

Figure 2:
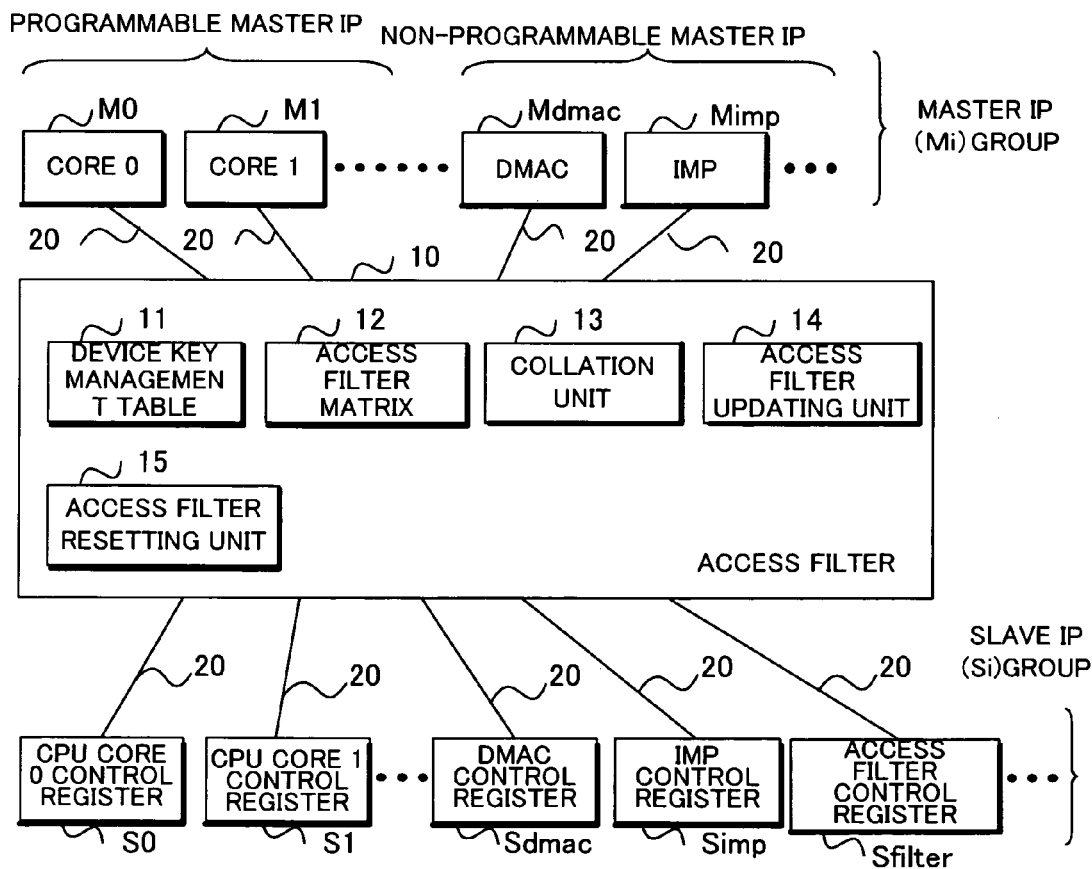
FIG. 2 is a block diagram showing an example of a structure of the access filter system according to the first mode of implementation.

FIG. 2 is a block diagram showing an example of a structure of the access filter system according to the present mode of implementation.

With reference to FIG. 2, kinds of devices in the present example of a structure include a programmable master IP (Intellectual Property) formed of a CPU core 0 (M0), a CPU core 1 (M1), a CPU core i (Mi) and the like, a non-programmable master IP formed of a DMAC (Direct Memory Access Controller) (Mdmac), an IMP (Image Processor) (Mimp) and the like, a master IP (Mi) group having the programmable master IP and the non-programmable master IP, a CPU core 0 control register (S0), a CPU core 1 control register (S1), a DMAC control register (Sdmac), an IMP control register (Simp), an access filter control register (Sfilter) as a control register unit of the access filter 10, and the like, and a slave IP (Si) group formed to have these registers.

The device forming the access filter system only needs to have the slave IP (Si), and the master IP (Mi) having at least one programmable master IP, and it may, for example, have only a DSP as a master IP (Mi) without having a CPU or may have one CPU and DSP each (see FIG. 3), and the CPU may be a multi-core or a single core. Since a main memory used by a CPU or the like is a device to be accessed, it is included in the slave IP group.

The access filter 10 in the present example of structure is disposed, in a multi-core system (which is typically formed of a multi-core SOC (system on a chip) and an external memory)) having a device as an accessing body (called master IP) such as a CPU (Central Processing Unit), a DSP (Digital Signal Processor), a DMAC or the like and a device to be accessed (called slave IP) such as a CPU control register or a memory, within the communication line (typically a bus in the SOC) 20 between the master IP and the slave IP, and has a function of identifying a task on the master IP to apply an access right on a task basis. The communication line 20 is, for example, a bus in the chip and has a function of realizing access (communication) from the master IP to the slave IP.

The access filter 10 comprises a device key management table 11, an access filter matrix 12, a collation unit 13, an access filter updating unit and an access filter resetting unit.

The device key management table 11 is a table for managing authorization to update the access filter matrix 12 by a secret key for each slave, as well as defining an address range of each slave. The access matrix 12 is a table for managing a right to access each slave IP at a certain time point.

Figures 3, 4, 5:
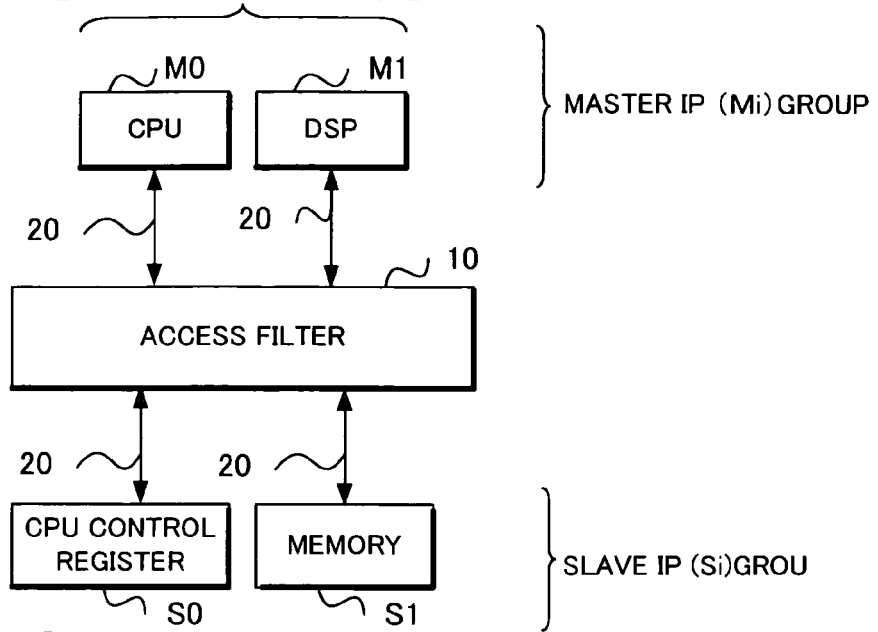
FIG. 3 is a block diagram showing an example of a structure of the access filter system according to the first mode of implementation.
FIG. 4 is a diagram for use in explaining a device key management table according to the first mode of implementation.
FIG. 5 is a diagram for use in explaining an access filter matrix according to the first mode of implementation.

FIG. 4 is a diagram for use in explaining the device key management table 11 according to the present mode of implementation.

The device key management table 11 manages information which specifies an address range of each slave IP and a secret key so as to be correlated with each other. With reference to FIG. 4, the device key management table 11 manages mask (ADMi), val (ADVi), KA (KAi) and KU (KUi) so as to be correlated with each slave (Si). Mask and val, which are set as a fixed value, are used for discriminating to which slave IP a certain master IP makes an access by a value output through an address bus. An address range of each slave (Si) is determined by an address A satisfying (A & mask)=val based on mask/val.

KA and KU are secret keys, with KA representing a device manager key having a manager authorization to enable device key update and update of the access filter matrix 12 with respect to each slave (Si) and KU representing a device user key having a user authorization to enable only update of the access filter matrix 12.

Therefore, unless the master IP has the secret key KA or KU corresponding to mask and val, it is not allowed to update the access filter matrix 12.

FIG. 5 is a diagram for use in explaining the access filter matrix 12 according to the present mode of implementation.

With reference to FIG. 5, the access filter matrix 12 indicates, as a matrix, existence/no-existence of each master's right to access each slave IP at a current time point, in which a short period when an access is required is set to be "allowed". Each element of the matrix is a true/false value, which indicates, when a value of AFMi, j at the crossing between the column of the master Mj and the row of the slave Si is a true value, that an access to the slave Si from the master Mj is currently allowed.

Figure 6:
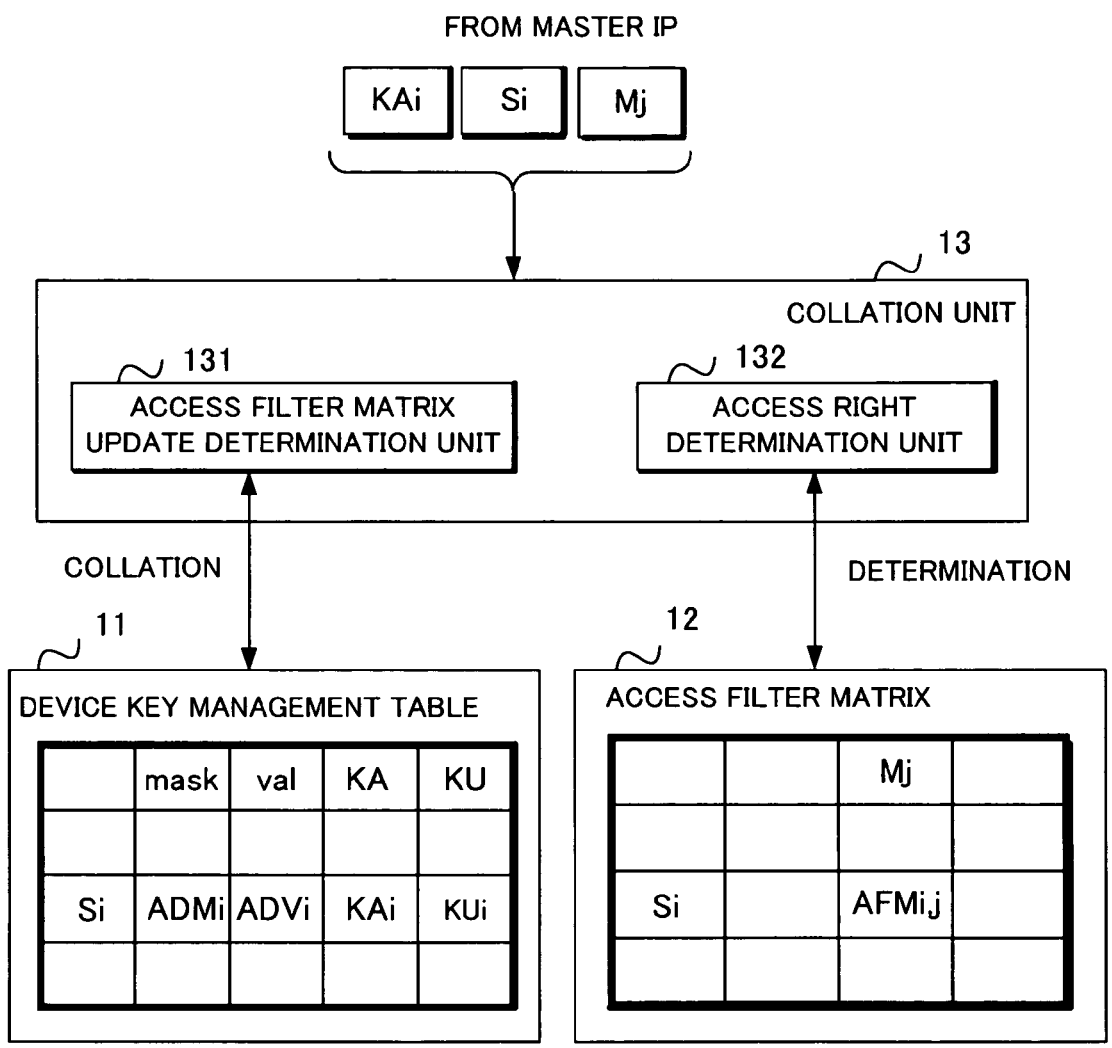
FIG. 6 is a block diagram showing a structure of a collation unit according to the first mode of implementation.

FIG. 6 is a block diagram showing a structure of the collation unit 13 according to the present mode of implementation. With reference to FIG. 6, the collation unit 13 comprises an access filter matrix update determination unit 131 for determining whether an IP (master IP) requesting an access to a slave IP has authorization to update the access filter matrix or not and an access right determination unit 132 for determining whether the IP has authorization to access the slave IP. The access filter matrix update determination unit 131 has a function of determining, based on the device key management table 11, whether an IP (master IP) requesting an access to an IP (slave IP) to be accessed has authorization to update the access filter matrix 12.

More specifically, when a task T on a CPU (master IP (Mj)) presents a device key Kai to access a device Si, the access filter matrix update determination unit 131 collates the device key KAi presented by the task T with the device key KA or the device key KU corresponding to the device Si based on the current device key management table 11 and when the keys are coincident, determines that the IP has the update authorization and when they are not, determines that it fails to have the update authorization.

The access right determination unit 132 has a function of determining whether an IP (master IP) requesting an access to an IP (slave IP) to be accessed has an authorized access right or not based on the access filter matrix 12. More specifically, in the matrix of the access filter matrix 12, the access right determination unit 132 discriminates a true or false value of a relevant column corresponding to a requested access (e.g. "AFMi, j" corresponding to an access to the slave IP (Si) requested by the master IP (Mj), see FIG. 5) to determine that the IP has an authorized access right when it is a true value and that the IP fails to have an authorized access right when it is a false value.

Figure 7:
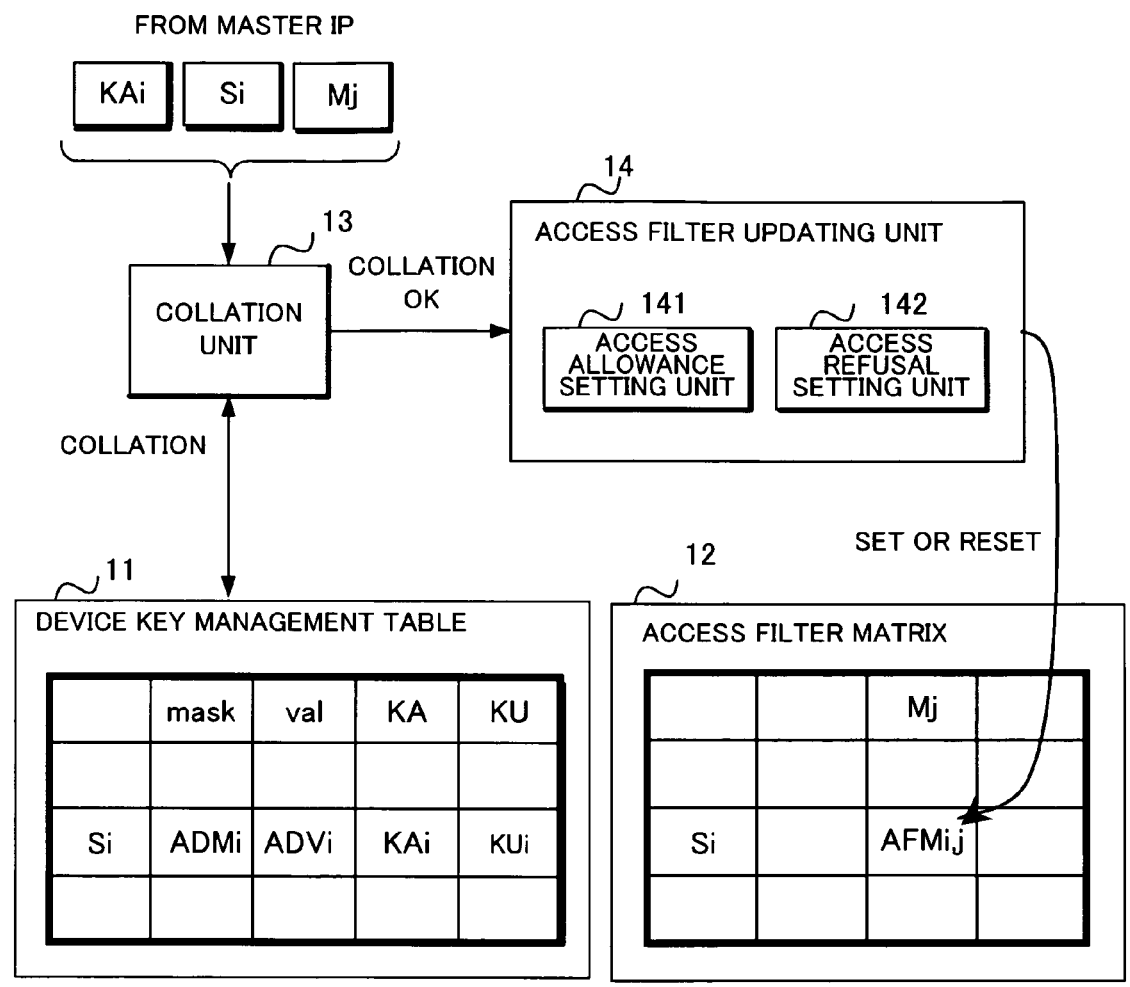
FIG. 7 is a diagram for use in explaining an access filter updating unit according to the first mode of implementation.

FIG. 7 is a diagram for use in explaining the access filter updating unit according to the present mode of implementation.

With reference to FIG. 7, the access filter updating unit has an access allowance setting unit 141 which, when the task T on the CPU (master IP Mj) accesses the device Si, if determination is made that update is authorized as a result of collation determination by the collation unit 13, sets a true value (access allowed) in the column corresponding to [master IP Mj, device Si] in the access filter matrix 12, and an access refusal setting unit 142 which, when the task T on the CPU (master IP Mj) finishes with a desired access to the device Si, sets a false value (access refusal) in the column corresponding to [master IP Mj, device Si] in the access filter matrix 12.

Figure 8:
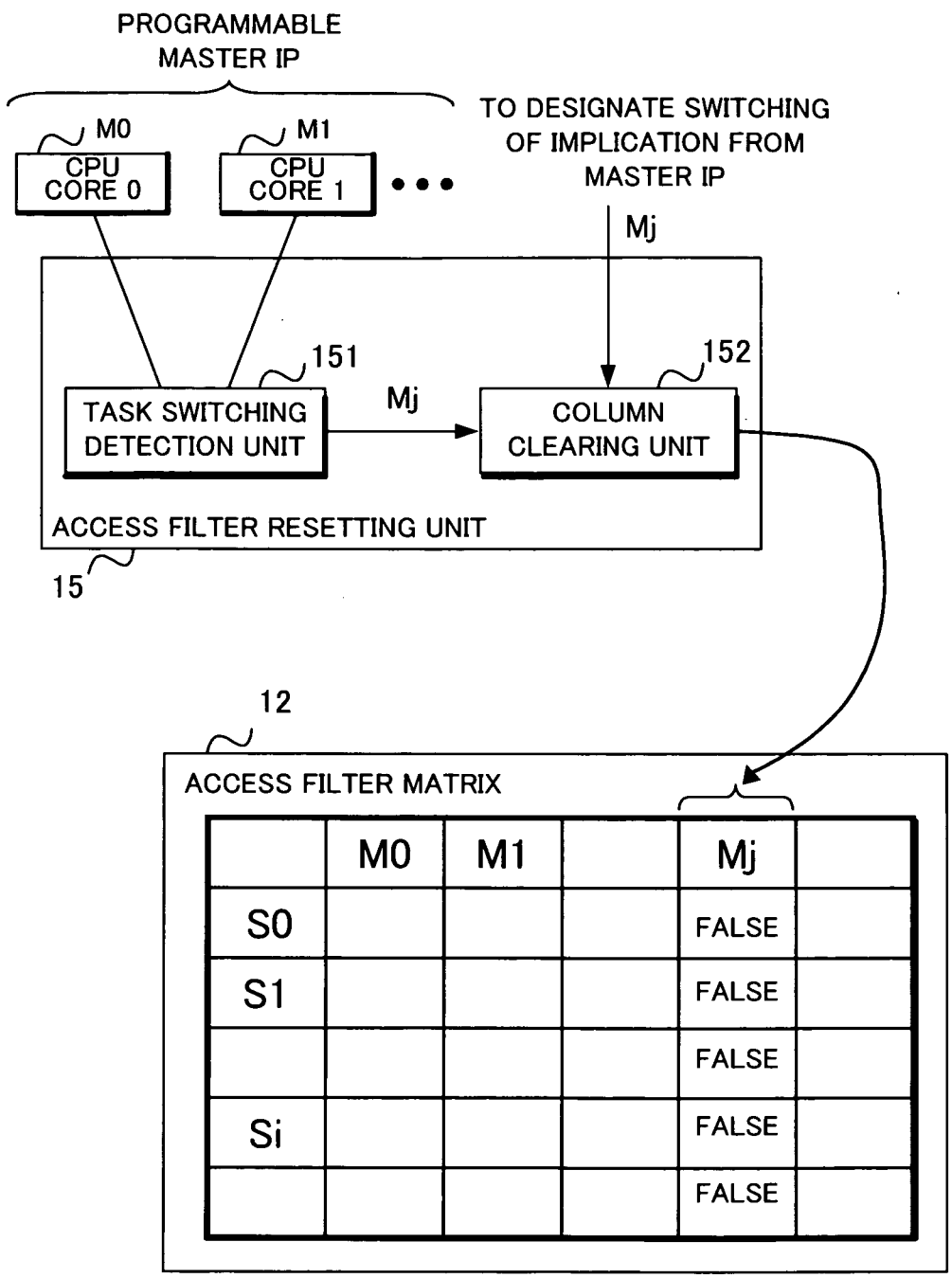
FIG. 8 is a diagram for use in explaining an access filter resetting unit according to the first mode of implementation.

FIG. 8 is a diagram for use in explaining the access filter resetting unit according to the present mode of implementation. With reference to FIG. 8, the access filter resetting unit, which has a function of setting refusal of an access from a CPU (master IP Mj) in which task switching occurs, comprises a task switching detection unit 151 and a column clearing unit 152.

The task switching detection unit 151 has a function of detecting occurrence of task switching on the CPU (master IP Mj) to specify the CPU (master IP Mj) in which task switching occurs. Since task switching is caused by "external interruption" or "exception", the task switching detection unit 151 detects "external interruption" by electrically observing an interruption signal line of the CPU. On the other hand, since "exception" is software operation, it cannot be electrically observed, so that it is detected by combining software such as accessing a register of the task switching detection unit 151, with a small code embedded in an exception handler.

Figure 9:
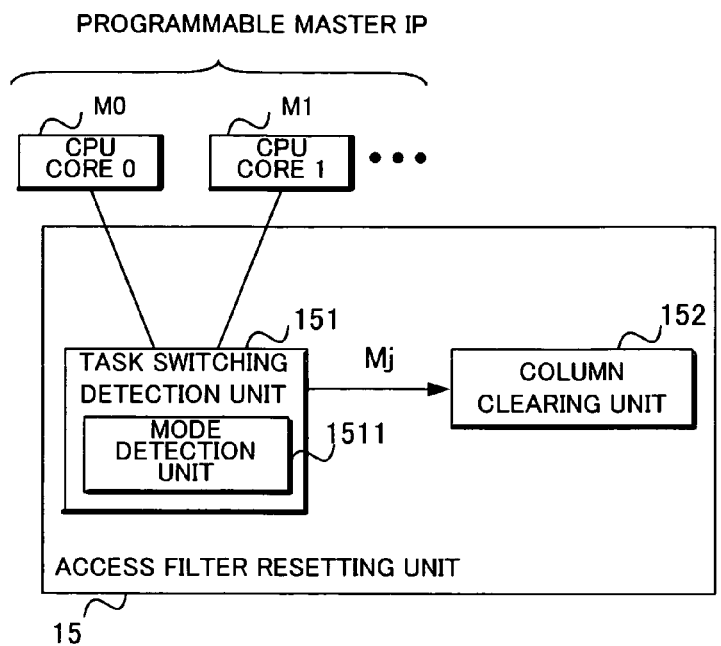
FIG. 9 is a diagram for use in explaining the access filter resetting unit according to the first mode of implementation.

In addition, when the master IP is such a CPU or the like whose operation state can be observed by an external signal line, realizing detection executed by the task switching detection unit 151 by a hardware structure enables transition of the operation state (user mode to kernel mode transition etc.) of the relevant CPU or the like to be detected in hardware. In this case, the task switching detection unit 151 may have a mode detection circuit 1511 as a circuit allowed to detect a mode (see FIG. 9). The column clearing unit 152 has a function of writing (setting) a false value in every value in the Mj column of the access filter matrix 12 with respect to the CPU (Master IP Mj) in which task switching specified by the task switching detection unit 151 occurs.

Here, a hardware structure of the access filter 10 will be described.

Figure 10:
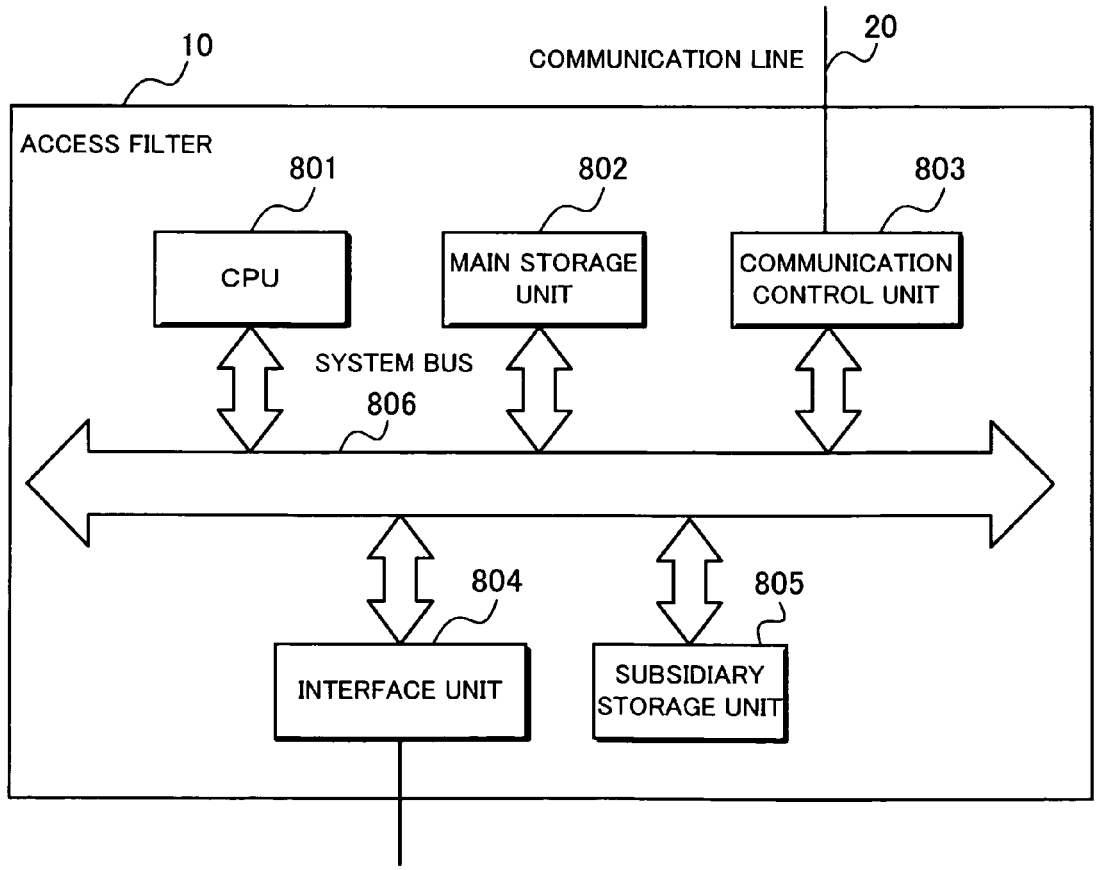
FIG. 10 is a block diagram showing a hardware structure of an access filter according to the first mode of implementation.

FIG. 10 is a block diagram showing a hardware structure of the access filter 10 according to the present mode of implementation.

With reference to FIG. 10, the access filter 10 according to the present invention, which can be realized by the same hardware structure as that of a common computer device, comprises a CPU (Central Processing Unit) 801, a main storage unit 802 which is a main memory such as an RAM (Random Access Memory) for use as a data working region or a data temporary saving region, a communication control unit 803 for transmitting and receiving data through the communication line 20, an interface unit 804 connected to a peripheral apparatus to transmit and receive data, a subsidiary storage unit 805 which is a hard disk device formed of a non-volatile memory such as ROM (Read Only Memory), a magnetic disk or a semiconductor memory, and a system bus 806 for connecting the above-described respective components with each other.

The access filter 10 according to the present invention has its operation realized not only in hardware with a circuit part mounted which is formed of a hardware part such as LSI (Large Scale Integration) having a program realizing these functions incorporated into the access filter 10 but also in software by executing a program which provides each function of each of the above-described components and each component to be described later by the CPU 801 on the computer processing device.

More specifically, the CPU 801 loads the program stored in the subsidiary storage unit 805 into the main storage unit 802 and executes the same to control the operation of the access filter 10, thereby realizing each of the above-described functions in software.

(Operation of the First Mode of Implementation)

First, description will be made of an example of device key assignment in initial setting of the access filter system according to the present mode of implementation.

Typically, assuming, for example, that since a system or an electronic device is ordinarily booted from an unrewritable ROM, contents written in the ROM are considered to be reliable, the device key management table 11 is set to be an initial state by an assignment method in which a device key is used without a change which is embedded in a boot ROM in a manner that an ordinary program cannot discriminate it, an assignment method in which a device key is changed based on date, an assignment method in which device keys successive according to device numbers are applied or other method.

The access filter matrix 12, in which all the columns have allowance (true) immediately after power application and thereafter, for example, at a stage where a certain master IP seizes an initial value of the device key, all the authorization of the other task is erased, then next task and next task, to generate a device key to be used and transfer the same one after another.

Figure 11:
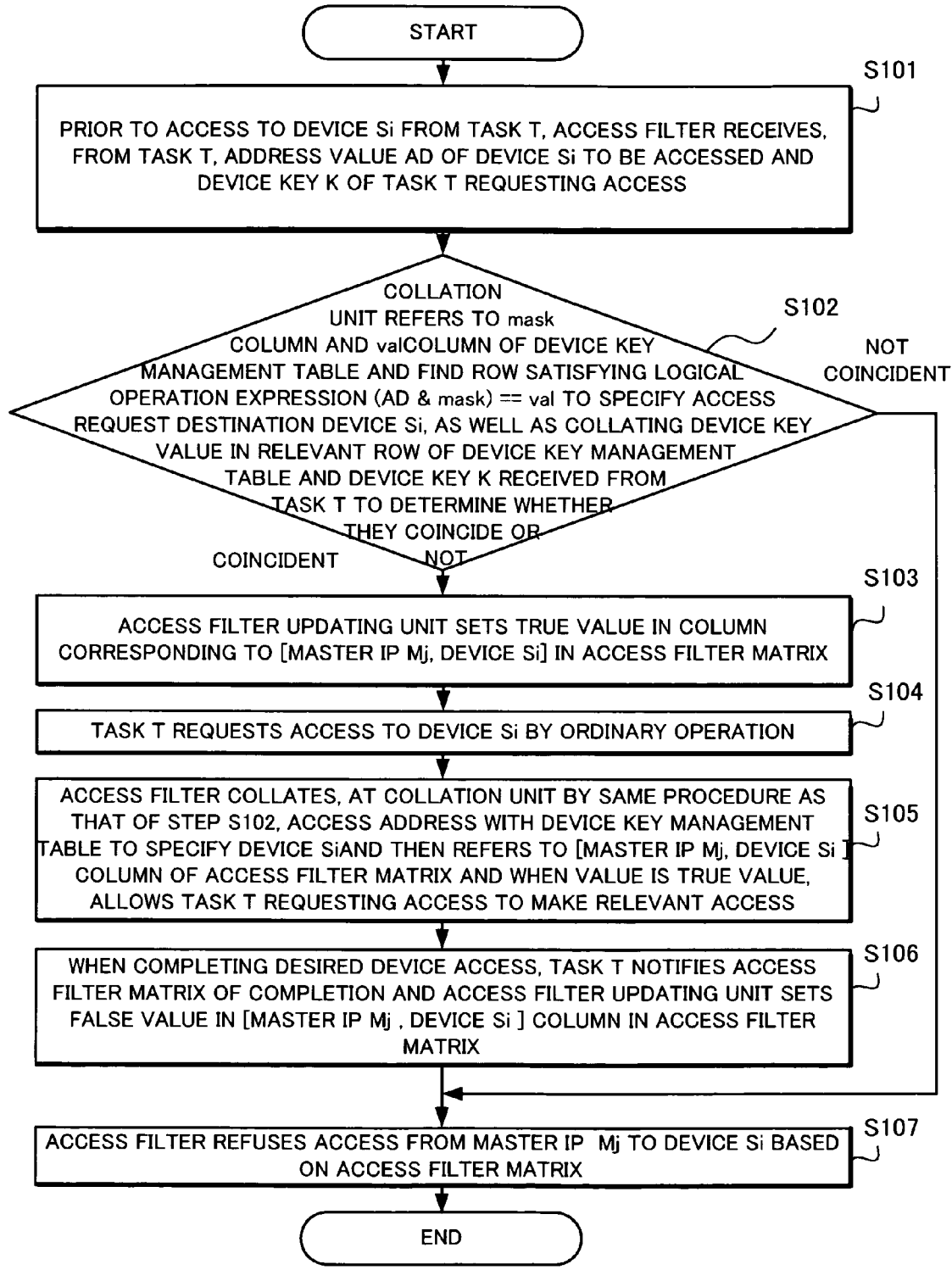
FIG. 11 is a flow chart showing operation of the access filter system according to the first mode of implementation.
Figure 12:
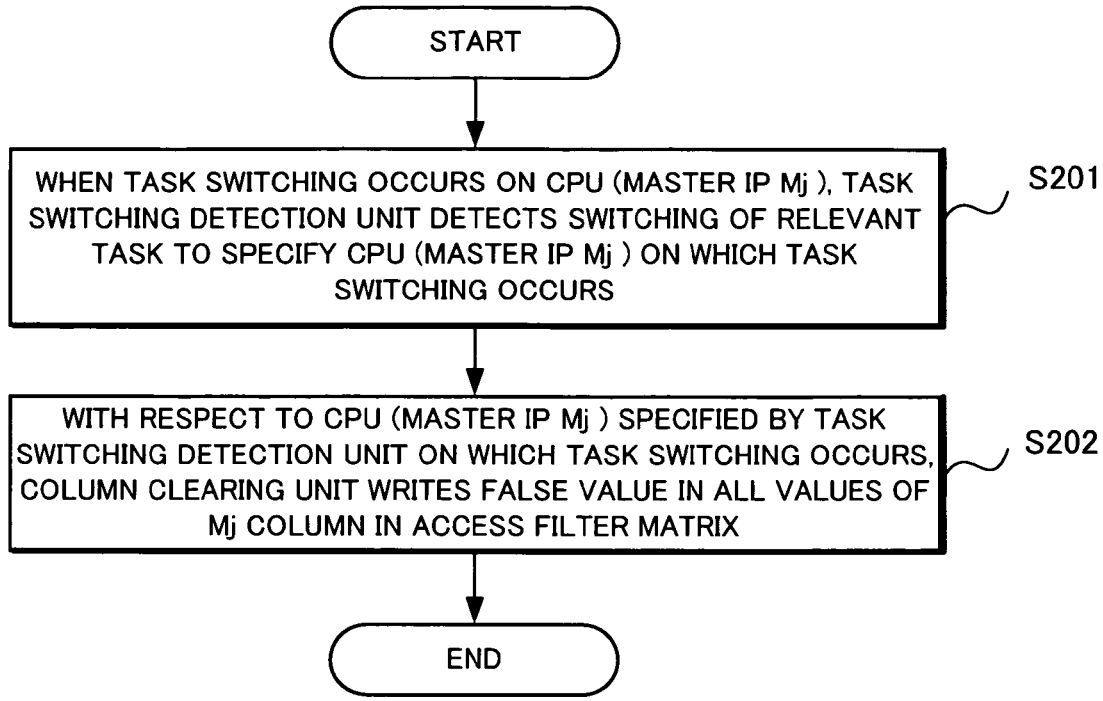
FIG. 12 is a flow chart showing operation of the access filter system according to the first mode of implementation.

FIG. 11 and FIG. 12 are flow charts showing operation of the access filter system according to the present mode of implementation.

With reference to FIG. 7 and FIG. 11, description will be made of operation of the access filter system when the CPU accesses a device. First, as an initial state, the task T on the CPU (master IP Mj) has a device key K (device manager key or device user key) valid for accessing the device Si. Step S101: prior to an access to the device Si from the task T, the access filter 10 receives, from the task T, an address value AD of the device Si to be accessed and the device key K of the task T having requested an access. Step S102: The collation unit 13 refers to the mask column and the val column of the device key management table 11 and finds a row satisfying a logical operation expression (AD & mask)=val to specify the access request destination device Si, as well as collating a device key value (KA or KU) in the relevant row of the device key management table 11 and the device key K received from the task T to find whether they coincide with each other or not. Step S103: When the keys are formed to be coincident as a result of collation, the access filter updating unit sets a true value in a column corresponding to [master IP Mj, device Si] in the access filter matrix 12. As a result, the CPU (master IP Mj) obtains a right to access the device Si. Step S104: Thereafter, the task T requests an access to the device Si by ordinary operation. Step S105: When an access request is made, the access filter 10 collates, at the collation unit 13, an access address with the device key management table 11 by the same manner as that of Step S102 to specify the device Si and then refers to the column [master IP Mj, device Si] in the access filter matrix 12 and when the value is a true value, allows the task T requesting the access to make the relevant access. Step S106: When the task T finishes with a series of desired device accesses, the task T notifies the access filter 10 of the end of the device access and the access filter updating unit responsively sets a false value in the column [master IP Mj, device Si] in the access filter matrix 12.

Step S107: Thereafter, the access filter 10 refuses an access from the master IP Mj to the device Si based on the access filter matrix 12.

With reference to FIG. 8 and FIG. 12, description will be made of operation of the access filter system to be executed when task switching occurs on the CPU. Step S201: When task switching occurs on the CPU (master IP Mj), the task switching detection unit 151 detects switching of the task to specify the CPU (master IP Mj) in which the task switching occurs. Step S202: With respect to the CPU (master IP Mj) specified by the task switching detection unit 151 on which task switching occurs, the column clearing unit 152 writes (sets) false values in all the values of the Mj column in the access filter matrix 12. As a result, the CPU on which switching occurs loses a right to access every device and the task as of after switching starts operation with no right to access any device. When the task as of after switching has a device key valid for accessing the device Si, however, the task T as of after switching is again assigned a right to access the device Si by the access filter 10 by the above-described procedure shown in FIG. 6 and FIG. 10. As described in the foregoing, when task switching occurs, a task as of before switching loses an already acquired device access right. Since task switching is invisible from the task, it looks like "the access right is lost without knowing". For preventing such a situation, at the time of device access, it is preferable to execute a series of processing of obtaining an access right, executing an access and returning an access right by inhibiting interruption. This is because inhibiting interruption enables occurrence of task switching invisible from a program to be suppressed. As described above, the present invention uses a task as a unit of access right assignment. In a common OS, device access is limited to a device driver and the device driver is called by a plurality of tasks. Accordingly, in this case, the following manner is preferable as to management of an access key and a function of a device driver.

In a case where the device driver is yet to be opened by any task, when a certain task opens the device driver, the device driver receives an access key from the task, keeps the access key inside safely, presents the device key to the access filter 10 at every device access to obtain an access right, accesses the device and then returns the access filter setting to release the access right. The series of operation is executed in the interruption inhibited state. This enables a device access in interruption handler to be executed without any problem. When the already opened device driver further opens another task, another task in question needs to have a device key. Unless the device driver confirms a valid device key, open fails.

At the time of closing the device driver at last, erase the device key kept in the device driver.

In a case, for example, where a plurality of tasks have the device key KU related to the same device, the same device can be shared by tasks on a plurality of CPUs by the procedures of the above-described Steps S101 through S105 and an access to the device can be refused by the above-described Steps S106 and S107 and the above-described Steps S201 and S202.

More specifically, with both of a device manager key (KA) and a device user key (KU) held valid for accessing the device Si, transferring the device user key (KU) to other task in the task group by a certain task as required enables a predetermined device to be shared by the task group in question while inhibiting other task than the task in question which has the device manager key (KA) from updating a device key.

Here, description will be made of operation of the entire access filter system according to the first mode of implementation with reference to FIG. 13.

Figure 13:
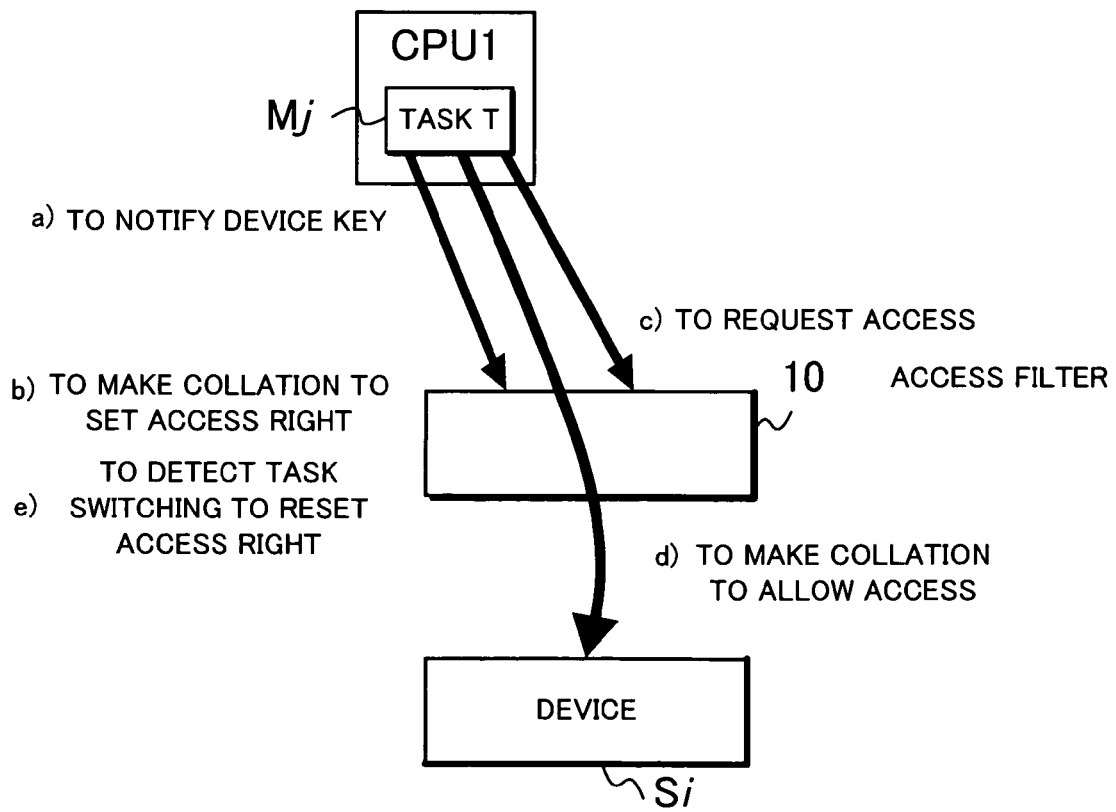
FIG. 13 is a diagram for use in explaining operation of the entire access filter system according to the first mode of implementation.

As shown in FIG. 13, in the access filter system, the task T (Mj) on the CPU 1 notifies the access filter 10 of the device key (a in FIG. 13) and when making collation of the notified device key based on the device key management table 11, the access filter 10 sets an access right on the access filter matrix 12 (b in FIG. 13).

When the task T (Mj) on the CPU 1 makes an access request to the access filter 10 (c in FIG. 13), the access filter 10 makes collation with respect to the task T (Mj) based on the device key management table 11 and the access filter matrix 12 to allow an access to the access target device (Si) (d in FIG. 13). Thereafter, upon detecting task switching, the access filter 10 resets the access right (e in FIG. 13).

(Effects of the First Mode of Implementation)

The present mode of implementation attains the following effects.

First, an access right differing with each task can be applied.

The reason is that with the provision of the access filter matrix 12 indicative of existence/non-existence of access right setting of each master IP (access requesting device or task) to each slave IP (device to be accessed) at the current time point and the device key management table 11 indicative of a corresponding relationship between a device key that each master IP has and the access filter matrix 12, a device key having authorization to update the access filter matrix 12 is applied on a master IP basis to determine based on the device key management table 11 whether an access requesting device has a device key valid for a device to be accessed, so that the access requesting device having a relevant valid device key is allowed to set an access right in the column of the relevant device to be accessed on the access filter matrix 12. Secondly, when a plurality of tasks of different properties exist on the same CPU or a plurality of CPUs, an access right differing with each task can be identified.

The reason is that with the provision of the access filter matrix 12 indicative of existence/non-existence of access right setting of each master IP to each slave IP at the current time point and the device key management table 11 indicative of a corresponding relationship between a device key that each master IP has and the access filter matrix 12, a device key is applied on a master IP basis to determine based on the device key, the access filter matrix 12 and the device key management table 11 whether a right to access a device to be accessed exists or not on a master IP basis. Thirdly, a task group (a set of a plurality of tasks operating in cooperation) bridging over a plurality of CPUs is allowed to share one device.

The reason is that with both the device manager key (KA) and the device user key (KU) valid for accessing the device Si held by a certain task in a task group, transferring the device user key (KU) to other task in the task group as required enables the task group in question to share the device user key for the relevant device.

Fourthly, risk of improper use of accesses to a shared device by other task than a main task can be reduced.

The reason is that while a task other than the main task is allowed to access the device in question, it is not allowed to update a device key because of lack of the device manager key (KA).

In addition, the main task's updating of a device key at such timing as completion of a series of accesses to the device in question enables reduction of potential risks caused by other task than the main task holding the device key for a long period of time.

Fifthly, reliability of a device to be accessed can be maintained because an access from a task having finished with predetermined processing is refused.

The reason is that the access filter resetting unit executes setting to refuse an access from a CPU (master IP (Mj)) in which task switching occurs. In a case where detection by the task switching detection unit 151 is realized by a hardware structure, setting is possible to refuse an access quicker and more reliably than in the detection by software.

Sixthly, since with such a CPU or the like as enabling the master IP to have its operation state observed by an external signal line, realizing detection by the task switching detection unit 151 by a hardware structure leads to detection of a transition of an operation state of the CPU in question or the like (user mode to kernel mode transition etc.) in hardware, executing all the detection by hardware increases reliability (possibility that a mechanism having an access filter system can continue operating safely against software having malicious intention or a bug).

(Second Mode of Implementation)

An access filter system according to a second mode of implementation of the present invention will be detailed with reference to the drawings.

(Structure of the Second Mode of Implementation)

Figure 14:
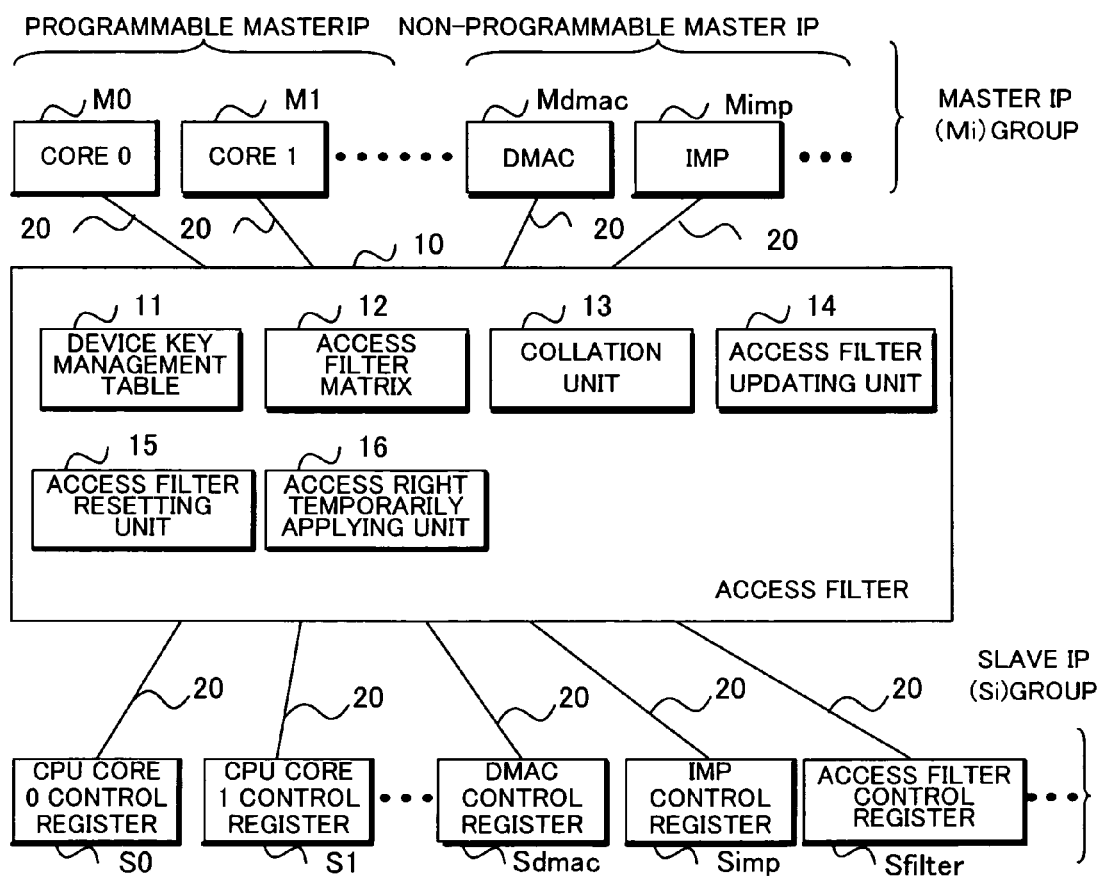
FIG. 14 is a block diagram showing an example of a structure of an access filter system according to a second mode of implementation of the present invention.

FIG. 14 is a block diagram showing an example of a structure of the access filter system according to the present mode of implementation.

With reference to FIG. 14, since the access filter system according to the present mode of implementation differs from the first mode of implementation in that the access filter comprises an access right temporarily applying unit 16, description will be made mainly of the different point in the following.

Figure 15:
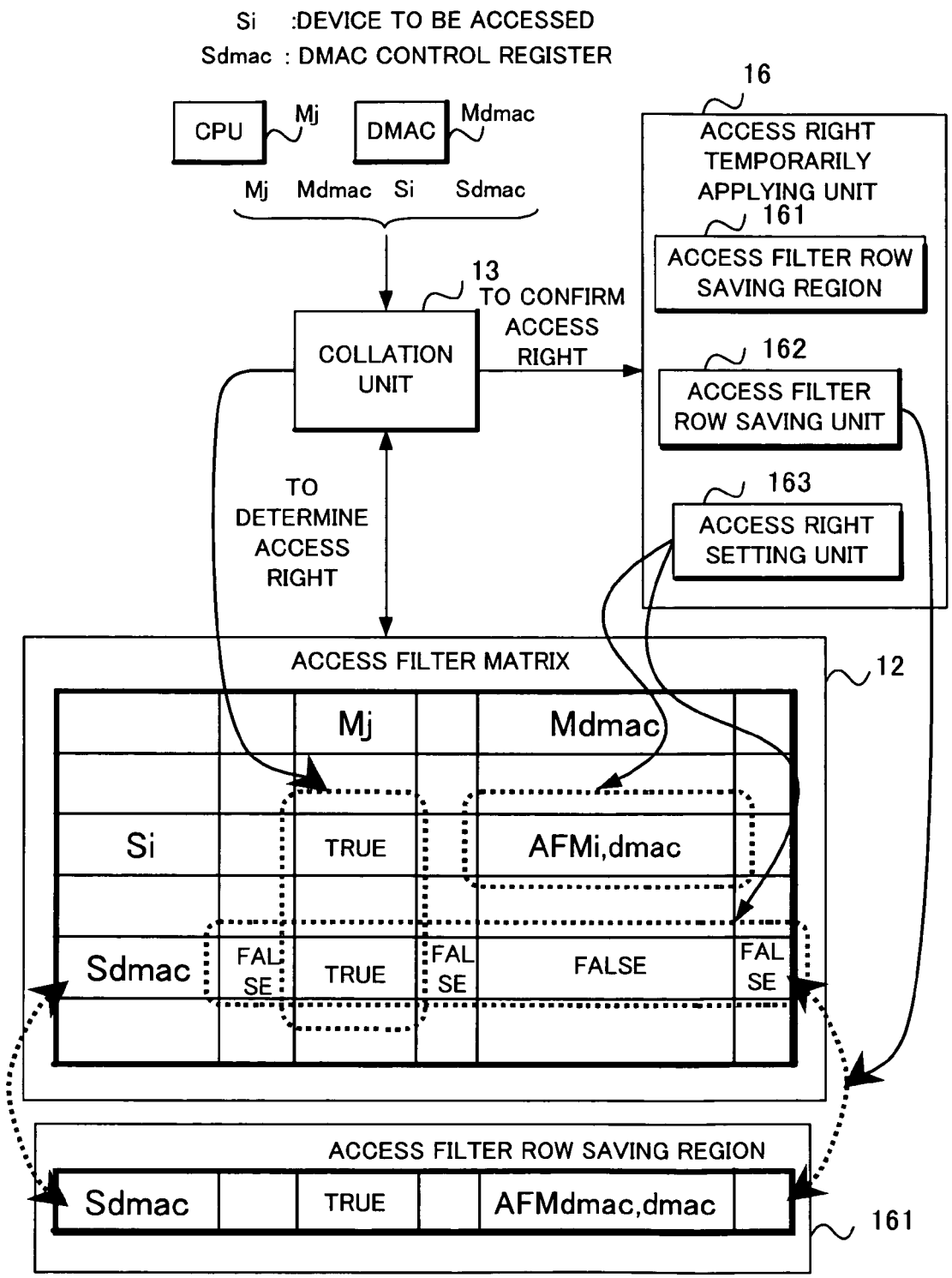
FIG. 15 is a diagram for use in explaining a structure of an access right temporarily applying unit according to the second mode of implementation.

FIG. 15 is a diagram for use in explaining a structure of the access right temporarily applying unit 16 according to the present mode of implementation.

With reference to FIG. 15, the access right temporarily applying unit 16 comprises an access filter row saving region (storage region) 161, an access filter row saving unit 162 and an access right setting unit 163.

The access filter row saving region 162 has a function of, when holding of an access right is confirmed by the collation unit 13, saving setting of a current access right related to a device of or with which an access requesting device wants exclusive use or sharing into the access filter row saving region 161. More specifically, in a case, for example, where the CPU (Mj) temporarily applies a right to access the device to be accessed (Si) to DMAC as one of other master IPs, the collation unit 13 confirms current existence/non-existence of a right that the CPU (Mj) holds to access the device (Si) to be accessed and the DMAC control register (Sdmac) and when access right holding is confirmed, the access filter row saving unit 162 saves current setting of the access right of the DMAC control register (Sdmac) as a slave IP into the access filter row saving region 161.

The access right setting unit 163 has a function of setting a right to access a device to which an access right is to be temporarily applied such that exclusive use or sharing that an access requesting device wants is enabled and a function of setting a right to access the device (Si) to be accessed at a device to which an access right is to be temporarily applied. More specifically, as to an access right of the DMAC control register (Sdmac) saved in the access filter row saving region 161, set a true value for the CPU (Mj) as a master IP which wants to exclusively use the DMAC control register (Sdmac), set a false value for other master IPs and as to DMAC (Mk) to which an access right is to be temporarily applied, set a true value for a right (AFMi, k) to access the device (Si) to be accessed.

(Operation of the Second Mode of Implementation)

Figure 16:
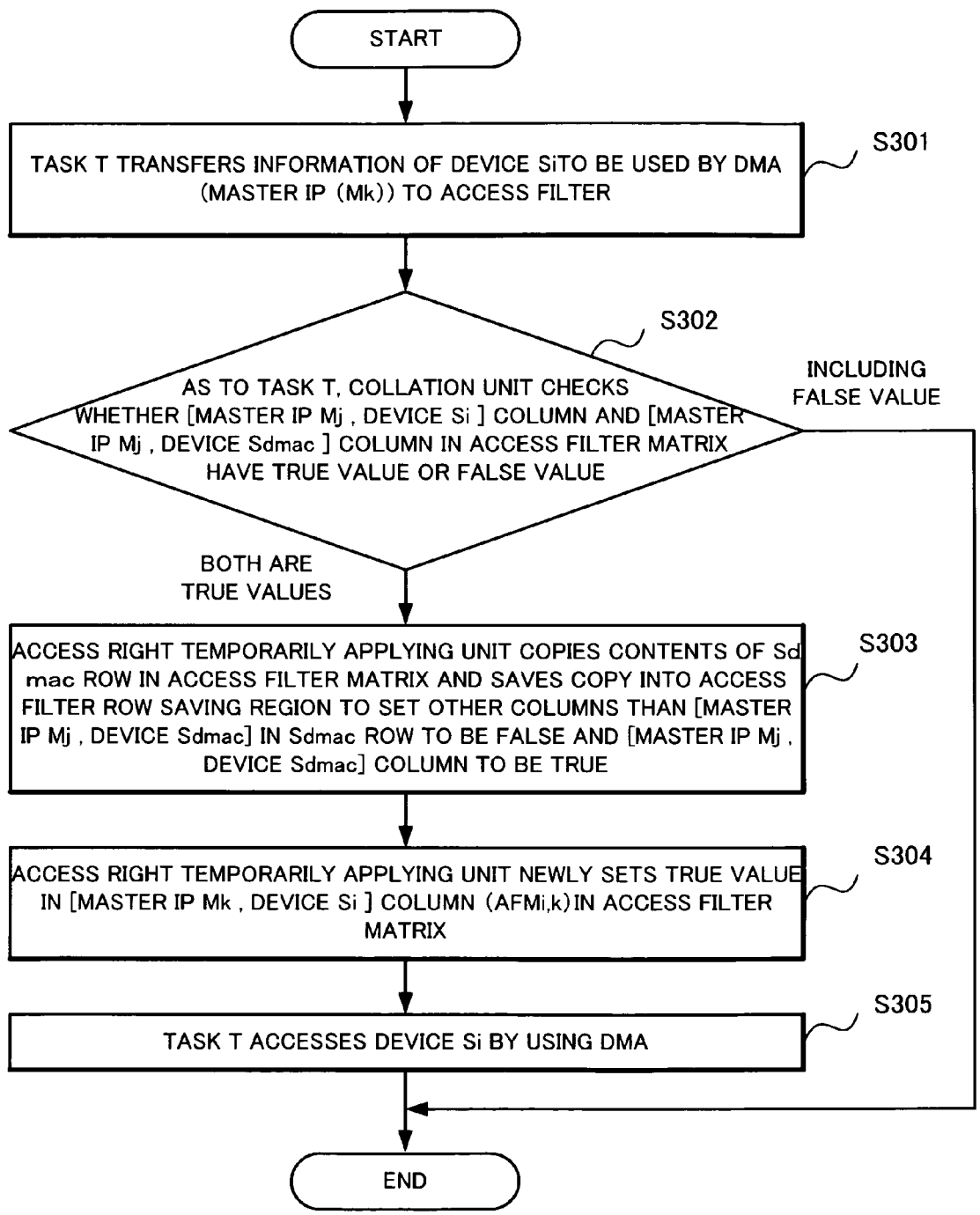
FIG. 16 is a flow chart showing operation of the access filter system according to the second mode of implementation.

FIG. 16 is a flow chart showing operation of the access filter system according to the present mode of implementation.

With reference to FIG. 14 and FIG. 16, operation will be described of the access filter system which is executed when a CPU accesses a device by using DMAC. First, assume that as an initial state, the task T on the CPU (master IP (Mj)) has a device key (a device manager key or a device user key for devices Si and Sdmac) valid for accessing the device Si and the device Sdmac (the control register unit of DMAC) and obtains a right to access the device Si and the device Sdmac. Step S301: The task T transfers the information of DMAC (master IP (Mdmac), and information about the slave IP (Sdmac) of the control register unit and the device Si to be used by the DMAC to the access filter 10. Step S302: With respect to the task T, the collation unit 13 checks whether the [master IP Mj, device Si] column and the [master IP Mj, device Sdmac] column in the access filter matrix 12 have a true value or a false value. Step S303: When both the [master IP Mj, device Si] column and the [master IP Mj, device Sdmac] column have a true value, the access right temporarily applying unit 16 then copies the contents of the Sdmac row in the access filter matrix 12 and saves the copy into the storage region (the access filter row saving region 161) in the access filter 10 to set other columns than the [master IP Mj, device Sdmac] column in the Sdmac row to be false and the [master IP Mj, device Sdmac] column to be true. In other words, this operation allows the CPU in question to exclusively use the device Sdmac, so that change of setting to the DMAC by others than the CPU in question will be inhibited.

Step S304: Furthermore, the access right temporarily applying unit 16 newly sets a true value in the [master IP Mdmac, device Si] column (AFMdmac, i) in the access filter matrix 12. In other words, this operation will allow an access from DMAC to the device Si. Step S305: After that, when the task T sets DMAC in an ordinary manner such that DMAC accesses the device Si, DMAC without an access key is allowed to access the device Si without any problem to achieve temporary application of an access right which is an initial object.

Figure 17:
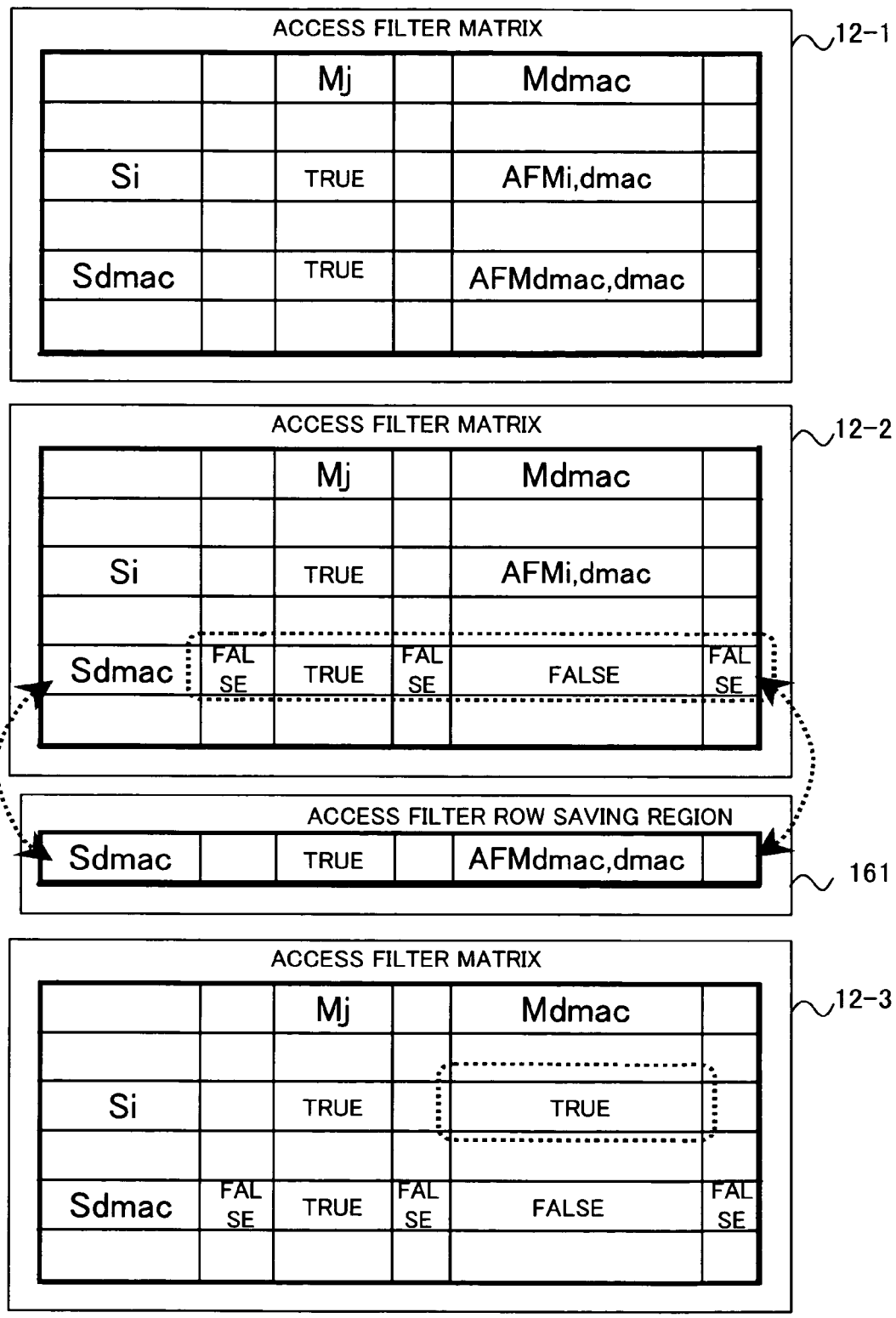
FIG. 17 is a diagram showing transition of an access filter matrix setting state according to the second mode of implementation.

Transition of a setting state of the access filter matrix 12 caused by each of the above-described operation is shown in FIG. 17.

An access filter matrix 12-1 shows a setting state from the initial state to Step S301 and Step S302, an access filter matrix 12-2 shows a setting state after Step S303 and an access filter matrix 12-3 shows a setting state after Step S304.

When task switch occurs, while a right to access from the CPU (Mj) to the device Si will automatically disappear similarly to the above-described first mode of implementation, a right to access from DMAC (Mdmac) to the device Si remains. Upon completion of the processing of DMAC, executing the above-described procedure in a reverse order such as Step S304 and Step S303 leads to return of the access right to a setting state of the access filter matrix 12 as of before temporary application. More specifically, by an instruction from a task, the access right temporarily applying unit 16 first at Step S304 returns the [master IP Mdmac, device Si] column (AFMdmac, i) in which a true value is set to an original setting value (false value) and then at Step S303 returns the contents saved in the access filter row saving region 161 to the contents of the Sdmac row. Here, operation of the entire access filter system according to the second mode of implementation will be described with reference to FIG. 18.

As shown in FIG. 18, in the access filter system, upon notification of information of the device Si and the device key by the task T (Mj) on the CPU 1 to the access filter 10 (a in FIG. 18), when allowed to execute collation of the notified device key based on the device key management table 11, the access filter 10 saves setting of the access right of the DMAC control register Sdmac (b in FIG. 18) and makes the task T exclusively use the access right of the DMAC control register Sdmac (c in FIG. 18) to set a right to access the device Si at DMAC (d in FIG. 18).

When an access from the task T (Mj) on the CPU 1 to the DMAC control register Sdmac is allowed as a result of collation by the access filter 10 (e in FIG. 18) and the task T (Mj) on the CPU 1 instructs the DMAC to access the device Si (f in FIG. 18), the DMAC makes an access request to the access filter 10 (g in FIG. 18) and the access filter 10 makes collation of the DMAC (Mdmac) based on the access filter matrix 12 to allow an access to the device (Si) to be accessed (h in FIG. 18).

(Effects of the Second Mode of Implementation)

The present mode of implementation achieves the following effects in addition to the above-described effects of the first mode of implementation.

First, it is possible to temporarily apply an access right to a master IP currently having no access right.

The reason is that based on an access right update request from a master IP having a device key valid for updating a right to access the device Si, the access right temporarily applying unit 16 saves the current setting of the access right of the device Si in the access filter matrix 12 into the access filter row saving region 161 to set a right to access the device (Si) to be accessed at the master IP currently having no access right.

Secondly, a master IP requesting an access is allowed to set an access right at, for example, a master IP such as DMAC which is incapable of autonomously obtaining an access right because of lack of its own program and use the master IP such as the DMAC to access a slave device to be accessed.

The reason is that based on an access request from a master IP having a device key valid for accessing the control register Sdmac which controls the device Si and the master IP such as the DMAC and updating an access right of the same, the access right temporarily applying unit 16 sets, at the master IP such as the DMAC, a right to access the device Si to be accessed.

In addition, a main task prevents a task other than the main task from continuing accessing a device key for a long period of time by re-setting access right setting saved in the access filter row saving region 161 at the access filter matrix 12 at such timing as completion of a series of accesses to the device in question.

(Third Mode of Implementation)

An access filter system according to a third mode of implementation of the present invention will be detailed with reference to the drawings.

(Structure of the Third Mode of Implementation)

FIG. 19 is a block diagram showing an example of a structure of the access filter system according to the present mode of implementation.

With reference to FIG. 19, since the access filter system according to the present mode of implementation differs from the first mode of implementation in that the access filter 10 has a device key generation unit 17, the following description will be made mainly of the difference.

Figure 20:
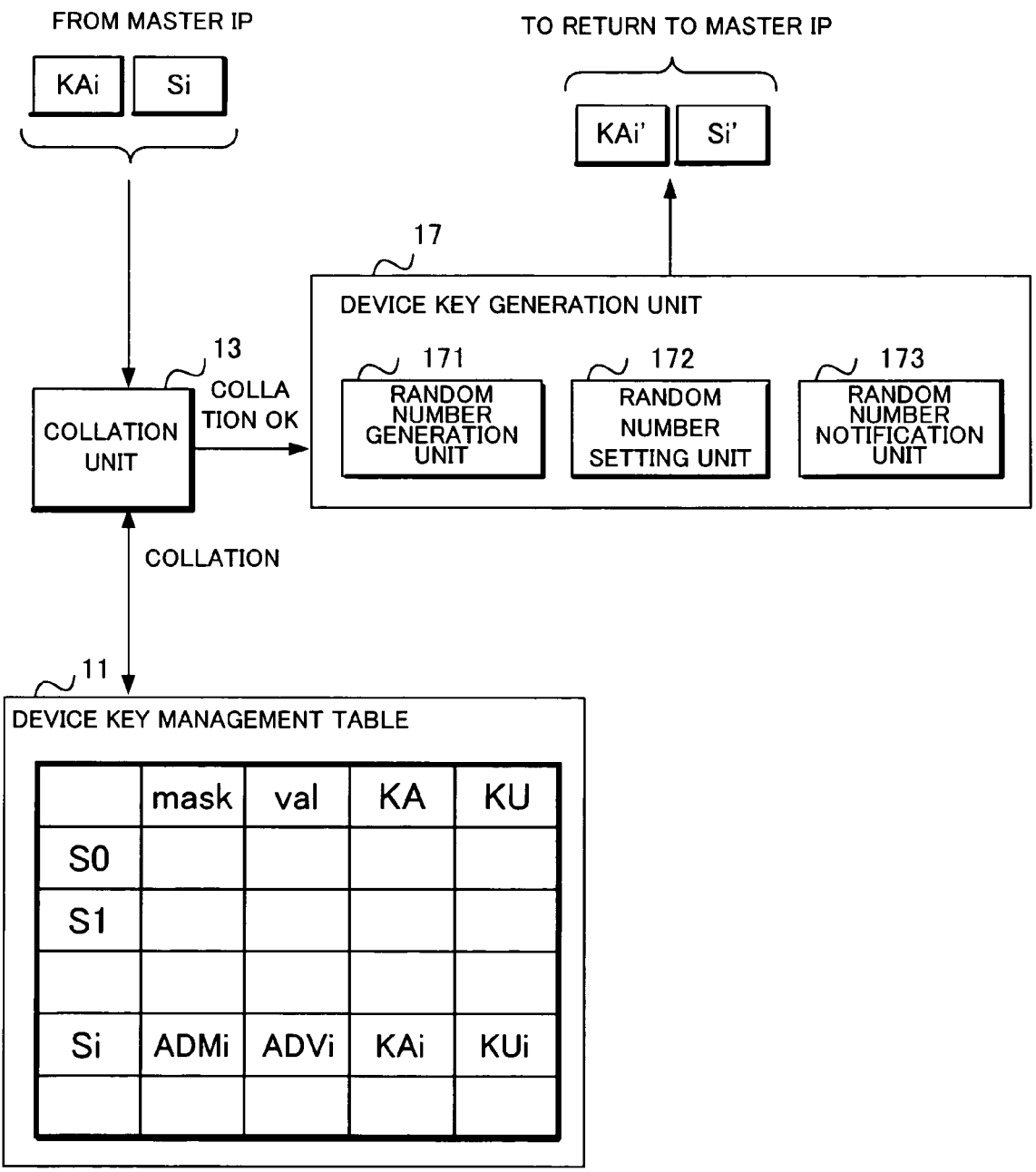
FIG. 20 is a block diagram showing a structure of a device key generation unit according to the third mode of implementation.

FIG. 20 is a block diagram showing a structure of the device key generation unit 17 according to the present mode of implementation.

With reference to FIG. 20, the device key generation unit 17 comprises a random number generation unit 171, a random number setting unit 172 and a random number notification unit 173.

The random number generation unit 171 has a function of generating another device key (device manager key (KAi') and device user key (KUi')) by using random numbers.

The random number setting unit 172 has a function of setting the generated device key (device manager key (KAi') and device user key (KUi')) at the current device key management table 11.

The random number notification unit 173 has a function of transferring the generated device key (device manager key (Kai') and device user key (KUi')) to a task of a master IP.

Substance of a device key generated by the device key generation unit 17 is a scalar integer, which is typically a 16-bit or 32-bit scalar integer. Program handling a device key needs to be carefully designed so as to prevent other task or an external device from taking a glance at the device key. It is therefore desirable that a source code of the program handling the device key is not open. In a case where it cannot be helped to open the source code, it is preferable to separate management of the device key into another task and make its source code not-open to transmit and receive the device key in safe inter-task communication at the time of execution. It is also preferable to design a program to update a device key by re-issuing at a certain frequency without continuously using a certain device key for a long period of time.

The present mode of implementation can be combined with the above-described first mode of implementation or the above-described second mode implementation.

(Operation of the Third Mode of Implementation)

FIG. 21 is a flow chart showing operation of the access filter system according to the present mode of implementation.

With reference to FIG. 20 and FIG. 21, operation will be described of the access filter system which is executed at the time of managing a device key. First, assume that as an initial state, the master IP (Mi) has both the valid device manager key (KAi) and device user key (KUi) and obtains a right to access the device Si. Step S501: The master IP (Mi) transfers information of the device Si to be accessed and the corresponding device manager key KAi to the access filter 10. Step S502: The collation unit 13 collates the KAi value transferred from the master IP (Mi) with the KA value in the current device Si row in the device key management table 11. Step S503: When the collation determines that they are coincident, the device key generation unit 17 generates another device key (the device manager key (KAi') and the device user key (KUi')) by using random numbers.

Step S504: The device key generation unit 17 sets the generated device key (the device manager key (KAi') and the device user key (KUi')) as new KA value and KU value in the Si row in the current device key management table 11.

Step S505: The device key generation unit 17 transfers the generated device key (the device manager key (KAi') and the device user key (KUi')) to the task on the master IP.

When a currently valid device manager key is transferred from the task on the master IP to the device key generation unit 17 by the foregoing operation, a pair of new device keys will be returned to the relevant task side.

(Effects of the Third Mode of Implementation)

The present mode of implementation attains the following effects in addition to the effects of the above-described first mode of implementation.

First, secrecy of the device manager key (KAi) and the device user key (KUi) is improved.

The reason is that in place of the device manager key (KAi) and the device user key (KUi), the device key (the device manager key (KAi') and the device user key (KUi')) generated by the device key generation unit 17 by using random numbers is used.

Secondly, when the present mode of implementation is combined with the above-described first mode of implementation, in addition to the above-described effects of the second mode of implementation, with respect to a master IP which applies a device key to other task, secrecy of the device manager key (KAi) and the device user key (KUi) which are valid for accessing the device Si and which the master IP originally has is improved.

The reason is that in place of the device user key (KUi), the device user key (KUi') which is generated by the device key generation unit 17 by using random numbers is applied to other task.

Thirdly, when the present mode of implementation is combined with the above-described first mode of implementation, in addition to the above-described effects of the second mode of implementation, it is possible to prevent a task to which an access right is temporarily applied from holding the access right even after the end of predetermined processing.

The reason is that since after the end of the predetermined processing by the task to which the access right is temporarily applied, the device manager key (KAi) and the device user key (KUi) are re-set, the collation unit 13 is not allowed to make collation by using the old device user key that the task to which the access right is temporarily applied has, resulting in failing to obtain an access right.

(Fourth Mode of Implementation)

An access filter system according to a fourth mode of implementation of the present invention will be detailed with reference to the drawings.

FIG. 22 is a diagram for use in explaining the access filter matrix 12 according to the present mode of implementation.

With reference to FIG. 22, since the access filter matrix 12 according to present mode of implementation differs from the first to third modes of implementation in that to a predetermined CPU 0 (M0), rights to access (true value) all the slave IPs (Si) are always set, description will be made mainly of the difference.

The master IP (M0) such as the CPU 0 is determined based on, for example, load of each CPU, or stability or a security level (reliability) of processing. In addition, the predetermined master IP (M0) may be a master IP whose safety is completely ensured by hardwire logic. Security level (reliability) here is that applied for each processing on a stage basis according to certain security policy.

With a device key (device manager key (KA), device user key (KU)) related to the slave IP (Si) in question at which a right to access (true value) the CPU 0 is always set applied to all the tasks on the CPU 0 as initial setting (see FIG. 4), the access may be allowed by the collation unit 13 and the access allowance setting unit 141 or the access filter 10 having received an access request from a task on the CPU 0 may unconditionally allow the task to access the slave IP (Si) and allow the same to update an access right of other master IP.

To the CPU 0, a right of an access (true value) not to all the slave IPs (Si) but to a predetermined slave IP (Si) may be always set.

Therefore, the access filter resetting unit 15 according to the present mode of implementation refrains from resetting an access right set at the CPU 0 at the time of task switching.

(Effects of the Fourth Mode of Implementation)

The present mode of implementation attains the following effects in addition to the effects of the above-described first to third modes of implementation.

First, since the access filter matrix 12 is set based on, for example, load of each CPU, or stability or a security level (reliability) of processing, an access from a task can be controlled based on the security level (reliability) and the like as compared with the first mode of implementation.

Secondly, since when the CPU 0 is always considered to be reliable, a task on the CPU 0 is allowed to access a device without requiring complicated operation of the access filter 10, a program of the task operable on the CPU 0 can be simplified to suppress an increase in a software scale while maintaining safety to some extent.

Thirdly, related to allowance/non-allowance of an access right of other task that a task on the CPU 0 requests, relying on software enables management of the software to be facilitated.

Fourthly, when the access filter 10 having received an access request from a task on the CPU 0 unconditionally allows the task to access the slave IP (Si) in question and to update an access right of other master IP, the column of the access filter matrix 12 corresponding to the CPU 0 can be reduced in number to contribute to reduction in hardware costs.

(Fifth Mode of Implementation)

An access filter system according to a fifth mode of implementation of the present invention comprises a modification example of the device key generation unit 17 according to the third mode of implementation.

The access filter system according to the present mode of implementation is obtained by changing a part or whole of the device key generation unit 17 from hardware package to software package. As an example of software package, with the random number generation unit 171 in the device key generation unit 17 formed into software, the random generation unit 171 as software generates a new pair of device keys KAi' and KUi' in addition to the current device manager key KAi and applies the same to the random number setting unit 172, so that the random number setting unit 172 registers the applied new device keys at the device key management table 11. As another example of software package, the random number generation unit 171 in the device key generation unit 17 is formed into software and processing of registering a new device key at the device key management table 11 is executed by the random setting unit 172 formed into software.

(Effects of the Fifth Mode of Implementation)

The present mode of implementation attains the effect of reducing hardware cost by changing a part or whole of the device key generation unit 17 from hardware package to software package in addition to the effects of the above-described first to fourth modes of implementation.

(Sixth Mode of Implementation)

An access filter system according to a sixth mode of implementation of the present invention comprises a modification example of the device key management table 11 according to the first mode of implementation.

While the device key management table 11 according to the first mode of implementation has two of the device manager key KAi for a manager and the device user key KUi for a user set as one pair, the device key management table 11 of the present mode of implementation, as shown in FIG. 23, has the device manager key KAi representing the device manager key KAi and the device user key KUi in the lump. When a task having the device manager key KAi requests setting of an access right of other task, application of the device manager key KAi to other task in question enables the applied device manager key KAi to allow or not to allow an access to a predetermined device to be accessed and setting of an access right to other task.

(Effects of the Sixth Mode of Implementation)

Since the device manager key KAi and the device user key KUi are set in the lump, the present mode of implementation enables the device key management table 11 to be reduced in size and the hardware logic of the collation unit 13, the access filter updating unit 14 and the like to be simplified to some extent, thereby reducing hardware cost.

(First Exemplary Embodiment)

The present exemplary embodiment which describes an exemplary embodiment of an access filter system according to the present invention with reference to the drawings corresponds to each of the above-described modes of implementation.

Figure 25:
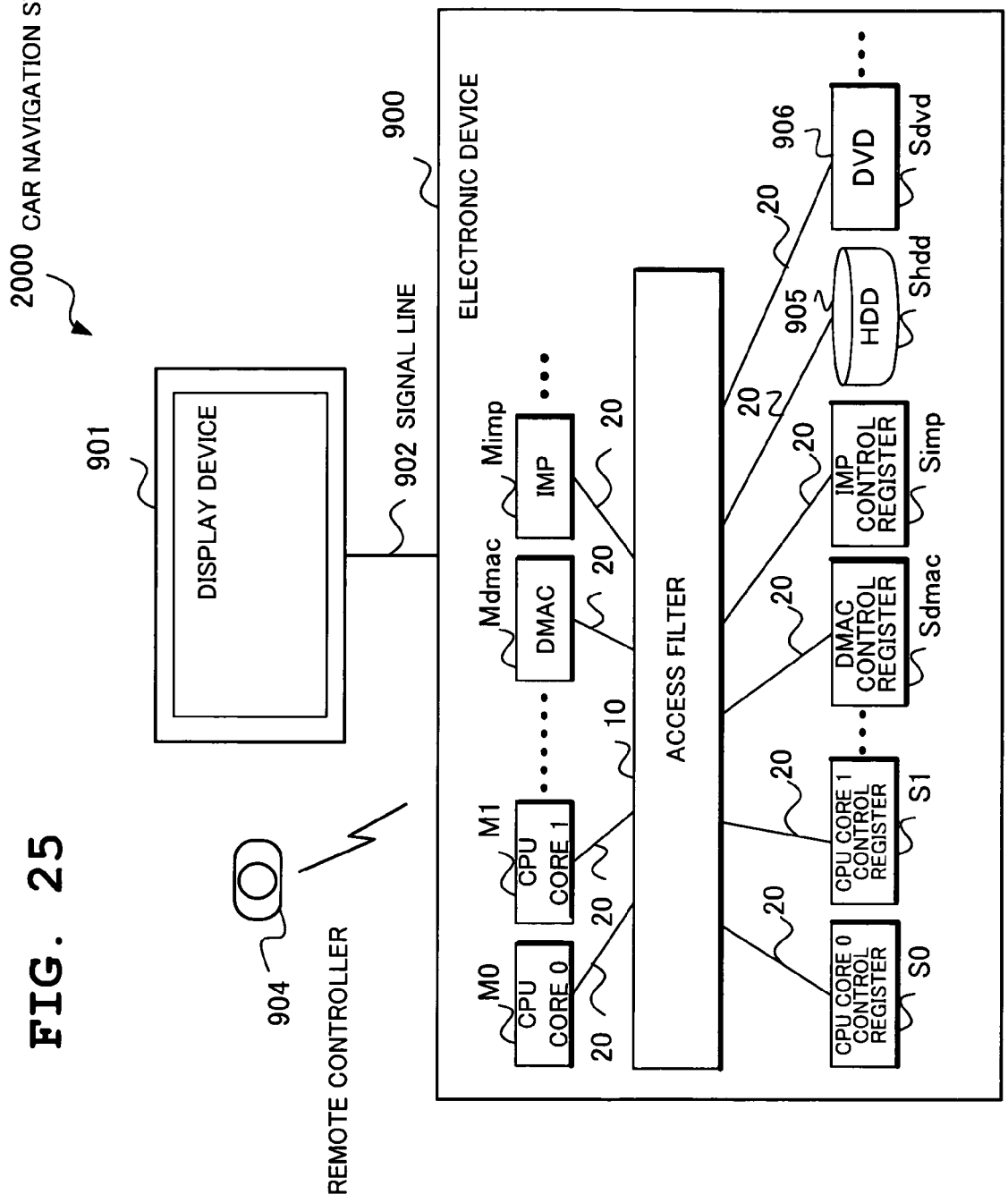
FIG. 25 is a diagram showing an embodiment of an electronic device comprising a circuit having the access filter system according to the present invention.

FIG. 24 and FIG. 25 show an exemplary embodiment of an electronic device comprising a circuit having the access filter system corresponding to each of the above-described modes of implementation, with FIG. 24 as an example of a cellular phone comprising a circuit having the access filter system according to the present invention and FIG. 25 as an example of a car navigation system comprising a circuit having the access filter system according to the present invention. In other words, it is an exemplary embodiment of an electronic device comprising a circuit having an IC on a chip which IC is mounted with firm ware that executes the functions of the access filter 10 according to the present invention.

Although the present invention has been described with respect to the preferred modes of implementations in the foregoing, the present invention is not necessarily limited to the above-described modes of implementations and can be implemented in various forms without departing from the spirit and scope of its technical idea.

Incorporation By Reference

The present application claims the priority based on Japanese Patent Application No. 2007-029677, filed on Feb. 8, 2007 and incorporates all the disclosure thereof.

What is claimed is:

1. An access control system, comprising:
   an electronic device; and
   an access control unit which controls an access between devices mounted on said electronic device;
   wherein said access control unit which applies unique secret information set for each said device as a right to access said device on a basis of each task operable on said electronic device and determines whether to allow an access to said device or not according to whether an access requesting task which requests an access to said device has secret information of said device,
   wherein said access control unit
      has an access control table in which existence/non-existence of said secret information of said device is set on a basis of said each task, and
      determines whether to allow an access to said device based on said access control table,
   wherein said access control table includes
      an access right setting table indicative of allowance/non-allowance of an access to said device, and
      a change authorization table indicative of allowance/non-allowance of setting change of said access right setting table according to said secret information, and said access control unit
      has an access right setting table changing unit configured to set, based on an access right setting request from a device having said access requesting task to which said secret information is applied and said change authorization table, a right to access an access target device to be accessed at a task corresponding to the access right setting request to change said access right setting table, and
      allows a device at which an access right is set to make an access based on said access right setting table as of after change,
   wherein said access control unit further comprises:
      a pseudo secret information generating unit configured to generate, by using random numbers, pseudo secret information from said secret information applied to said access requesting task,
      a change authorization table changing unit configured to change, in said change authorization table, said secret information of said access target device corresponding to said secret information into said pseudo secret information generated, and
      a pseudo secret information notifying unit configured to notify said access requesting task of said pseudo secret information generated,
   wherein said access control unit uses said pseudo secret information in place of said secret information.

2. The access control system according to claim 1, wherein said access right setting table changing unit, when said access requesting task to which said secret information is applied requests setting of an access right to other task, enables both said tasks to share an access right by applying said secret information to other task in question.

3. The access control system according to claim 2, wherein said access right setting table changing unit detects switching of a task and sets a device having a task as of before switching to be inhibited from accessing every device.

4. The access control system according to claim 1, wherein said access right setting table changing unit:
   has an access right setting information preserving unit configured to temporarily preserve setting information of an access right on said access right setting table which information is set at said access target device corresponding to said secret information applied to said access requesting task, and
   after the completion of predetermined processing by a task in a device at which a right to access the access target device is newly set by said access right setting table changing unit, re-sets said access right setting information preserved at the access target device.

5. The access control system according to claim 1, wherein based on an access right setting request from said access requesting task to which said secret information is applied, said access right setting table changing unit newly sets an access right at a device which is incapable of autonomously obtaining an access right.

6. The access control system according to claim 1, wherein said secret information includes
   first secret information indicative of setting information change authorization of an access right related to corresponding said access target device on said change authorization table, as well as being indicative of authorization to update said secret information into another new valid secret information, and
   second secret information indicative of setting information change authorization of an access right related to corresponding said access target device on said change authorization table, and
   said access requesting task to which said first secret information is applied or said access control unit notifies said second secret information to other task to which the access requesting task requests to set an access right.

7. The access control system according to claim 1, wherein said access control unit allows a request for changing said access right setting table from a predetermined task without fail.

8. The access control system according to claim 1, wherein said access control unit allows a request for accessing an access target device to be accessed from a predetermined task without fail.

9. The access control system according to claim 8, wherein said access right setting table has a right to access said access target device set with respect to a predetermined task without fail.

10. The access control system according to claim 7, wherein said predetermined task is a task determined based on a condition including at least one of processing load, stability and security level.

11. The access control system according to claim 1, wherein said access control unit is formed of a hardware circuit.

12. The access control system according to claim 1, wherein said access control unit is provided on a communication path between specific devices.

13. An access control method of controlling an access between devices mounted on an electronic device, comprising:
   an access control step of applying unique secret information set for each said device as a right to access said device on a basis of each a task operable on said electronic device and determining whether to allow an access to said device or not according to whether an access requesting task which requests an access to said device has secret information of said device, wherein at said access control step, whether to allow an access to said device is determined based on an access control table in which existence/non-existence of said secret information of said device is set on a basis of said each task, wherein said access control table includes an access right setting table indicative of allowance/non-allowance of an access to said device, and a change authorization table indicative of allowance/non-allowance of setting change of said access right setting table according to said secret information, and said access control step includes an access right setting table changing step of setting, based on an access right setting request from a device having said access requesting task to which said secret information is applied and said change authorization table, a right to access an access target device to be accessed at a task corresponding to the access right setting request to change said access right setting table, and wherein an access to a device at which an access right is set is allowed based on said access right setting table as of after change, wherein said access control step further comprises:

a pseudo secret information generating step of generating, by using random numbers, pseudo secret information from said secret information applied to said access requesting task, a change authorization table changing step of changing, in said change authorization table, said secret information of said access target device corresponding to said secret information into said pseudo secret information generated, and a pseudo secret information notifying step of notifying said access requesting task of said pseudo secret information generated, wherein said pseudo secret information is used in place of said secret information.

14. The access control method according to claim 13, wherein at said access right setting table changing step, when said access requesting task to which said secret information is applied requests setting of an access right to other task, said secret information is applied to other task in question.

15. The access control method according to claim 14, wherein at said access right setting table changing step, switching of a task is detected to set a device having a task as of before switching to be inhibited from accessing every device.

16. The access control method according to claim 13, wherein said access right setting table changing step includes an access right setting information preserving step of temporarily preserving setting information of an access right on said access right setting table which information is set at said access target device corresponding to said secret information applied to said access requesting task, and wherein after the completion of predetermined processing by a task in a device at which a right to access the access target device is newly set at said access right setting table changing step, said access right setting information preserved is reset at the access target device.

17. The access control method according to claim 13, wherein at said access right setting table changing step, based on an access right setting request from said access requesting task to which said secret information is applied, an access right is newly set at a device which is incapable of autonomously obtaining an access right.

18. The access control method according to claim 13, wherein said secret information includes:

first secret information indicative of setting information change authorization of an access right related to corresponding said access target device on said change authorization table, as well as being indicative of authorization to update said secret information into another new valid secret information, and second secret information indicative of setting information change authorization of an access right related to corresponding said access target device on said change authorization table, and wherein at said access control step, said second secret information is notified to other task to which said access requesting task to which said first secret information is applied requests to set an access right.

19. The access control method according to claim 13, wherein at said access control step, a request for changing said access right setting table from a predetermined task is allowed without fail.

20. The access control method according to claim 13, wherein at said access control step, a request for accessing an access target device to be accessed from a predetermined task is allowed without fail.

21. An electronic device, comprising:

an access control unit configured to control an access between devices, wherein said access control unit applies unique secret information set for each said device as a right to access said device on a basis of each task operable on said electronic device and determines whether to allow an access to said device or not according to whether an access requesting task which requests an access to said device has secret information of said device, wherein said access control unit has an access control table in which existence/non-existence of said secret information of said device is set on a basis of said each task, and determines whether to allow an access to said device based on said access control table, wherein said access control table includes an access right setting table indicative of allowance/non-allowance of an access to said device, and a change authorization table indicative of allowance/non-allowance of setting change of said access right setting table according to said secret information, and said access control unit comprises an access right setting table changing unit which sets, based on an access right setting request from a device having said access requesting task to which said secret information is applied and said change authorization table, a right to access an access target device to be accessed at a task corresponding to the access right setting request to change said access right setting table, and allows a device at which an access right is set to make an access based on said access right setting table as of after change, wherein said access control unit further comprises:

a pseudo secret information generating unit configured to generate, by using random numbers, pseudo secret information from said secret information applied to said access requesting task, a change authorization table changing unit configured to change, in said change authorization table, said secret information of said access target device corresponding to said secret information into said pseudo secret information generated, and a pseudo secret information notifying unit configured to notify said access requesting task of said pseudo secret information generated, wherein said access control unit uses said pseudo secret information in place of said secret information.

22. The electronic device according to claim 21, wherein said access right setting table changing unit, when said access requesting task to which said secret information is applied requests setting of an access right to other task, enables both said tasks to share an access right by applying said secret information to other task in question.

23. The electronic device according to claim 22, wherein said access right setting table changing unit detects switching of a task and sets a device having a task as of before switching to be inhibited from accessing every device.

24. The electronic device according to claim 21, wherein said access right setting table changing unit:

has an access right setting information preserving unit configured to temporarily preserve setting information of an access right on said access right setting table which information is set at said access target device corresponding to said secret information applied to said access requesting task, and after the completion of predetermined processing by a task in a device at which a right to access the access target device is newly set by said access right setting table changing unit, re-sets said access right setting information preserved at the access target device.

25. The electronic device according to claim 21, wherein based on an access right setting request from said access requesting task to which said secret information is applied, said access right setting table changing unit newly sets an access right at a device which is incapable of autonomously obtaining an access right.

26. The electronic device according to claim 21, wherein said secret information includes:

first secret information indicative of setting information change authorization of an access right related to corresponding said access target device on said change authorization table, as well as being indicative of authorization to update said secret information into another new valid secret information, and second secret information indicative of setting information change authorization of an access right related to corresponding said access target device on said change authorization table, and wherein said access requesting task to which said first secret information is applied or said access control unit notifies said second secret information to other task to which the access requesting task requests to set an access right.

27. The electronic device according to claim 21, wherein said access control unit allows a request for changing said access right setting table from a predetermined task without fail.

28. The electronic device according to claim 21, wherein said access control unit allows a request for accessing an access target device to be accessed from a predetermined task without fail.

29. The electronic device according to claim 28, wherein said access right setting table has a right to access said access target device set with respect to a predetermined task without fail.

30. The electronic device according to claim 27, wherein said predetermined task is a task determined based on a condition including at least one of processing load, stability and security level.

31. The electronic device according to claim 21, wherein said access control unit is formed of a hardware circuit.

32. The electronic device according to claim 21, wherein said access control unit is provided on a communication path between specific devices.

33. A non-transitory computer readable medium storing a control program for execution on a computer to control an access between devices mounted on an electronic device, wherein said control program causes said computer to execute an access control processing of applying unique secret information set for each said device as a right to access said device on a basis of a task operable on said electronic device and determining whether to allow an access to said device or not according to whether an access requesting task which requests an access to said device has secret information of said device, wherein said access control table in which existence/non-existence of said secret information of said device is set on a basis of each said task includes an access right setting table indicative of allowance/non-allowance of an access to said device, and a change authorization table indicative of allowance/non-allowance of setting change of said access right setting table according to said secret information, and said access control processing includes an access right setting table changing processing of setting, based on an access right setting request from a device having said access requesting task to which said secret information is applied and said change authorization table, a right to access an access target device to be accessed at a task corresponding to the access right setting request to change said access right setting table, and wherein an access to a device at which an access right is set is allowed based on said access right setting table as of after change, wherein said access control step further comprises:

a pseudo secret information generating step of generating, by using random numbers, pseudo secret information from said secret information applied to said access requesting task, a change authorization table changing step of changing, in said change authorization table, said secret information of said access target device corresponding to said secret information into said pseudo secret information generated, and a pseudo secret information notifying step of notifying said access requesting task of said pseudo secret information generated, wherein said pseudo secret information is used in place of said secret information.

34. The non-transitory computer readable medium according to claim 33, wherein in said access right setting table changing processing, when said access requesting task to which said secret information is applied requests setting of an access right to other task, said secret information is applied to other task in question.

35. The non-transitory computer readable medium according to claim 34, wherein at said access right setting table changing step, switching of a task is detected to set a device having a task as of before switching to be inhibited from accessing every device.

36. The non-transitory computer readable medium according to claim 33, wherein said access right setting table changing step includes an access right setting information preserving step of temporarily preserving setting information of an access right on said access right setting table which information is set at said access target device corresponding to said secret information applied to said access requesting task, and
> wherein after the completion of predetermined processing by a task in a device at which a right to access the access target device is newly set at said access right setting table changing step, said access right setting information preserved is reset at the access target device.

37. The non-transitory computer readable medium according to claim 33, wherein at said access control step, a request for changing said access right setting table from a predetermined task is allowed without fail.

38. The non-transitory computer readable medium according to claim 33, wherein at said access control step, a request for accessing an access target device to be accessed from a predetermined task is allowed without fail.

* * * * *